(12) United States Patent
Curley et al.

(10) Patent No.: US 11,053,439 B2
(45) Date of Patent: Jul. 6, 2021

(54) METHODS FOR SYNTHESIS OF INORGANIC NANOSTRUCTURES USING MOLTEN SALT CHEMISTRY

(71) Applicant: NANOSYS, INC., Milpitas, CA (US)

(72) Inventors: John J. Curley, San Francisco, CA (US); Alexander Tu, San Jose, CA (US); Wenzhou Guo, San Jose, CA (US); Chunming Wang, Milpitas, CA (US); Christian Ippen, Cupertino, CA (US); Charles Hotz, San Rafael, CA (US)

(73) Assignee: NANOSYS, INC., Milpitas, CA (US)

( * ) Notice: Subject to any disclaimer, the term of this patent is extended or adjusted under 35 U.S.C. 154(b) by 0 days.

(21) Appl. No.: 16/782,250

(22) Filed: Feb. 5, 2020

(65) Prior Publication Data
US 2020/0325395 A1    Oct. 15, 2020

Related U.S. Application Data

(60) Provisional application No. 62/801,460, filed on Feb. 5, 2019.

(51) Int. Cl.
*C09K 11/88* (2006.01)
*C09K 11/08* (2006.01)
(Continued)

(52) U.S. Cl.
CPC ........ *C09K 11/883* (2013.01); *C09K 11/0883* (2013.01); *G02F 1/133308* (2013.01);
(Continued)

(58) Field of Classification Search
CPC ... C09K 11/883; C09K 11/0883; C09K 11/56; C09K 11/70; B82Y 20/00; B82Y 40/00; G02F 2202/36; G02F 2001/133614
See application file for complete search history.

(56) References Cited

U.S. PATENT DOCUMENTS

2017/0323991 A1* 11/2017 Klimov ................ C09K 11/883
2017/0349824 A1   12/2017 Kan
(Continued)

FOREIGN PATENT DOCUMENTS

CN    108384531 A  *  8/2018  ............. C09K 11/02
CN    108384531 B     8/2018
(Continued)

OTHER PUBLICATIONS

Srivastava, Vishwas, et al. "Colloidal Chemistry in Molten Salts: Synthesis of Luminescent In1—xGaxP and In1—xGaxAs Quantum Dots." Journal of the American Chemical Society 140(38): 12144-12151, American Chemical Society (2018).
(Continued)

*Primary Examiner* — Donald L Raleigh
(74) *Attorney, Agent, or Firm* — Sterne, Kessler, Goldstein & Fox P.L.L.C.

(57) ABSTRACT

The invention relates to highly luminescent nanostructures with strong blue light absorbance, particularly core/shell nanostructures comprising an $In_{(1-x)}Ga_xP$ core and ZnSe and/or ZnS shell layers, wherein $0<x<1$. The invention also relates to methods of producing such nanostructures.

20 Claims, 4 Drawing Sheets

(51) Int. Cl.
    *G02F 1/1333*     (2006.01)
    *G02F 1/13357*     (2006.01)
    *B82Y 20/00*     (2011.01)
    *B82Y 40/00*     (2011.01)

(52) U.S. Cl.
    CPC ........ *G02F 1/133617* (2013.01); *B82Y 20/00* (2013.01); *B82Y 40/00* (2013.01); *G02F 2202/36* (2013.01)

(56) References Cited

U.S. PATENT DOCUMENTS

| | | | |
|---|---|---|---|
| 2017/0373232 A1* | 12/2017 | Kan | .......................... C01G 9/08 |
| 2018/0119007 A1* | 5/2018 | Ippen | .................... H01L 51/502 |
| 2019/0389738 A1 | 12/2019 | Talapin et al. | |

FOREIGN PATENT DOCUMENTS

| KR | WO-2017115920 A1 * | 7/2017 | ......... H01L 31/0352 |
|---|---|---|---|
| WO | WO 2017/115920 A1 | 7/2017 | |

OTHER PUBLICATIONS

Srivastava, Vishwas, et al. "Understanding and curing structural defects in colloidal GaAs nanocrystals." Nano letters 17(3): 2094-2101, American Chemical Society (2017).
International Search Report and Written Opinion for International Application No. PCT/US2020/014432, European Patent Office, Netherlands, dated Jun. 30, 2020, 12 pages.

* cited by examiner

METHODS FOR SYNTHESIS OF INORGANIC NANOSTRUCTURES USING MOLTEN SALT CHEMISTRY

BACKGROUND OF THE INVENTION

Field of the Invention

The invention relates to the field of nanotechnology. More particularly, the invention relates to highly luminescent nanostructures with strong blue light absorbance, particularly core/shell nanostructures comprising an $In_{(1-x)}Ga_xP$ core and ZnSe and/or ZnS shell layers, wherein $0<x<1$. The invention also relates to methods of producing such nanostructures.

Background Art

Semiconductor nanostructures can be incorporated into a variety of electronic and optical devices. The electrical and optical properties of such nanostructures vary, e.g., depending on their composition, shape, and size. For example, size-tunable properties of semiconductor nanostructures are of great interest for applications such as light emitting diodes (LEDs), lasers, and biomedical labeling. Highly luminescent nanostructures are particularly desirable for display applications.

The quantum dot color filter or quantum dot color converter (QDCC) is an emerging element in display architectures. The quantum dot performance in a QDCC can be measured by the photoluminescent emission maximum, the full width at half maximum (FWHM), the amount of blue light transmitted, and the external quantum efficiency. Among these characteristics, the amount of blue light transmitted through the quantum dot layer is of particular importance. The amount of blue light transmittance directly impacts the color gamut, film down-conversion efficiency, and thickness of the display element. Moreover, if there is significant blue light leakage through green or red pixels, manufacturers will be forced to introduce additional filters into the display adding to the costs and reducing operational efficiency. As a result, it is important that the quantum dot film itself has strong blue light absorption. A need exists to prepare nanostructure compositions that have improved blue light absorbance and low blue light transmittance.

BRIEF SUMMARY OF THE INVENTION

The present invention provides a nanostructure comprising a core, the core comprising $In_{(1-x)}Ga_xP$, wherein $0<x<1$; and at least one shell disposed on the core, the at least one shell comprising ZnSe; wherein the optical density at 450 nm per total mass ($OD_{450}$/total mass) of the nanostructure is between about 0.3 and about 1.0.

In some embodiments, the core further comprises a Group III-V semiconductor material comprising InN, InSb, InAs, AlN, AlP, AlSb, AlAs, GaN, GaP, GaSb, GaAs, or a combination thereof.

In some embodiments, the at least one shell further comprises CdS, CdSe, CdO, CdTe, ZnS, ZnO, ZnTe, MgTe, GaAs, GaSb, GaN, HgO, HgS, HgSe, HgTe, InAs, InSb, InN, AlAs, AlN, AlSb, AlS, PbS, PbO, PbSe, PbTe, MgO, MgS, MgSe, MgTe, CuCl, Ge, Si, or a combination thereof.

In some embodiments, the nanostructure comprises two shells comprising a first shell disposed on the core and a second shell disposed on the first shell.

In some embodiments, the nanostructure comprises a first shell comprising ZnSe and a second shell.

In some embodiments, the second shell comprises a Group II-VI semiconductor material comprising ZnS, ZnO, ZnSe, ZnTe, MgS, MgO, MgSe, MgTe, or a combination thereof. In some embodiments, the second shell comprises ZnSe, ZnS, or a combination thereof. In some embodiments, the second shell comprises ZnS.

In some embodiments, the diameter of the core is between about 3 nm and about 10 nm. In some embodiments, the diameter of the core is about 5 nm.

In some embodiments, the thickness of the first shell is between about 0.5 nm and about 4 nm. In some embodiments, the thickness of the first shell is about 1.5 nm.

In some embodiments, the thickness of the second shell is between about 0.5 nm and about 3 nm. In some embodiments, the thickness of the second shell is about 0.5 nm.

In some embodiments, the $OD_{450}$/total mass of the nanostructure is between about 0.5 and about 0.7. In some embodiments, the $OD_{450}$/total mass of the nanostructure is about 0.6.

In some embodiments, the wavelength of maximum absorbance of the nanostructure is between about 430 nm and about 490 nm. In some embodiments, the wavelength of maximum absorbance of the nanostructure is about 450 nm.

In some embodiments, the emission wavelength of the nanostructure is between about 500 nm and about 540 nm. In some embodiments, the emission wavelength of the nanostructure is about 520 nm.

In some embodiments, the nanostructure is a quantum dot.

In some embodiments, the nanostructure is free of cadmium.

The present invention also provides a device comprising the nanostructure according to any one of the embodiments described above.

In some embodiments, the device is a display device.

In some embodiments, the display device comprises a quantum dot color converter comprising: a back plane; a display panel disposed on the back plane; and a quantum dot layer comprising the nanostructure, the quantum dot layer disposed on the display panel.

In some embodiments, the quantum dot layer comprises a patterned quantum dot layer.

In some embodiments, the backplane comprises a blue LED, an LCD, an OLED, or a microLED.

In some embodiments, the display device does not comprise a blue light filter. In some embodiments, the blue light filter has a transmittance smaller than 15% for light with a wavelength below about 510 nm.

In some embodiments, the quantum dot layer has a thickness between about 1 μm and about 25 μm. In some embodiments, the quantum dot layer has a thickness between about 5 μm and about 25 μm. In some embodiments, the quantum dot layer has a thickness between about 10 μm and about 12 μm.

The present invention also provides a method of making $In_{(1-x)}Ga_xP$ nanostructures, wherein $0<x<1$, comprising: (a) admixing InP nanostructures comprising at least one sulfur-containing ligand and a halide salt mixture at a temperature between about 250° C. and 450° C. to form a molten mixture; (b) admixing the molten mixture obtained in (a) with a gallium source at a temperature between about 290° C. and 380° C.; to provide the $In_{(1-x)}Ga_xP$ nanostructures.

In some embodiments, the at least one sulfur-containing ligand comprises lithium sulfide, sodium sulfide, potassium sulfide, or a combination thereof. In some embodiments, wherein the at least one sulfur-containing ligand comprises potassium sulfide.

In some embodiments, the InP nanostructures comprising a sulfur-containing ligand are obtained by (c) admixing InP nanostructures with at least one sulfur-containing ligand in solution to give InP nanostructures with a sulfur-containing ligand bound to the surface and (d) admixing the InP nanostructures with a sulfur-containing ligand bound to the surface obtained in (c) with at least one solvent.

In some embodiments, the at least one solvent in (d) comprises formamide.

In some embodiments, admixing the solid in (b) and the halide salt mixture further comprises grinding the solid in (b) and the halide salt mixture prior to the heating.

In some embodiments, the halide salt in (a) comprises a lithium halide, a potassium halide, a cesium halide, or a combination thereof. In some embodiments, the halide salt in (a) comprises lithium bromide, potassium bromide, and a cesium bromide.

In some embodiments, the gallium source in (b) is selected from the group consisting of gallium fluoride, gallium chloride, gallium bromide, gallium iodide, and a combination thereof. In some embodiments, the gallium source in (b) is selected from the group consisting of gallium oxide, gallium sulfide, gallium selenide, gallium telluride, and a combination thereof. In some embodiments, the gallium source in (b) is selected from the group consisting of methyl gallium, ethyl gallium, propyl gallium, and a combination thereof.

In some embodiments, admixing the molten mixture in (a) and the gallium source is at a temperature between about 290° C. and 330° C.

In some embodiments, admixing the molten mixture in (a) and the gallium source is performed for between about 20 minutes and about 180 minutes.

In some embodiments, the molar ratio of gallium atom in the gallium source to indium atom in the InP nanostructure is between about 0.3 and about 5. In some embodiments, the molar ratio of gallium atom in the gallium source to indium atom in the InP nanostructure is between about 0.5 and about 2. In some embodiments, the molar ratio of gallium atom in the gallium source to indium atom in the InP nanostructure is about 1.

In some embodiments, the above method further comprises admixing the admixture in (b) and at least one solvent comprising a sulfide ligand, wherein the sulfide ligand comprises lithium sulfide, sodium sulfide, potassium sulfide, or a combination thereof.

In some embodiments, the above method further comprises admixing the admixture in (b) and at least one solvent comprising a sulfide ligand, wherein the sulfide ligand comprises potassium sulfide.

The present invention also provides a method of making a $In_{(1-x)}Ga_xP/ZnSe/ZnS$ core/shell/shell nanostructures, comprising: (a) providing a core comprising $In_{(1-x)}Ga_xP$ nanostructures; (b) admixing the $In_{(1-x)}Ga_xP$ nanostructures in (a) with a first zinc source and a selenium source; and (c) admixing the admixture in (b) with a second zinc source and a sulfur source to provide the $In_{(1-x)}Ga_xP/ZnSe/ZnS$ core/shell/shell nanostructures.

In some embodiments, the first zinc source in (b) is selected from the group consisting of diethylzinc, dimethylzinc, diphenylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the first zinc source in (b) is zinc oleate.

In some embodiments, the selenium source in (b) is selected from the group consisting of trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis (trimethylsilyl) selenide, and mixtures thereof. In some embodiments, the selenium source in (b) is trioctylphosphine selenide.

In some embodiments, the second zinc source in (c) is selected from the group consisting of diethylzinc, dimethylzinc, diphenylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the second zinc source in (c) is zinc oleate.

In some embodiments, the sulfur source in (c) is selected from the group consisting of elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and mixtures thereof. In some embodiments, the sulfur source in (c) is dodecanethiol.

In some embodiments, the admixing in (b) is at a temperature between 250° C. and 350° C. In some embodiments, the admixing in (b) is at a temperature of about 300° C.

In some embodiments, the admixing in (c) is at a temperature between about 170° C. and about 250° C. In some embodiments, the admixing in (c) is at a temperature of about 220° C.

DETAILED DESCRIPTION OF THE INVENTION

Definitions

Figure 1:
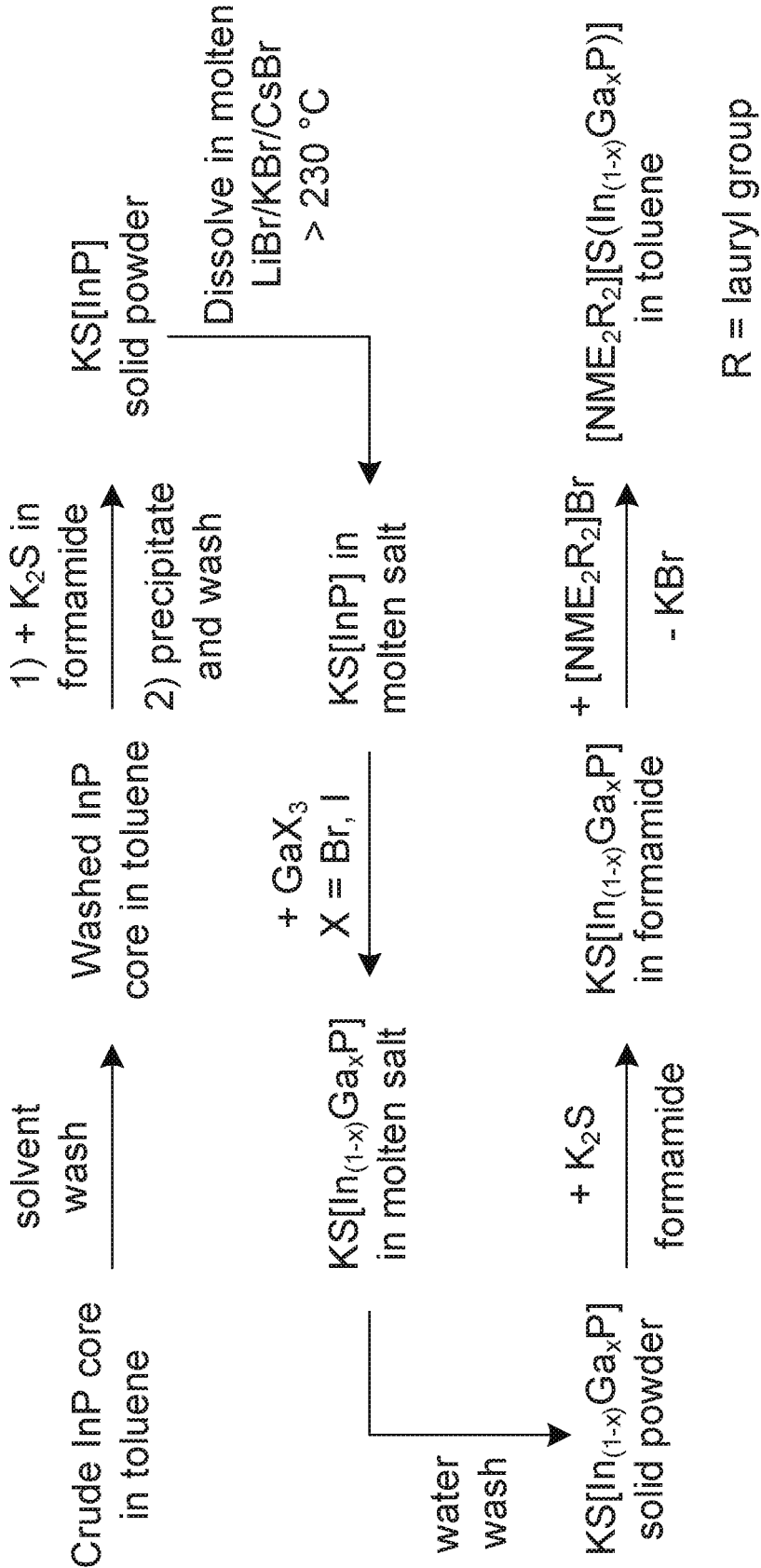
FIG. 1 is a flow chart showing a synthetic scheme for the preparation of $In_{(1-x)}Ga_xP$ nanostructures.

Unless defined otherwise, all technical and scientific terms used herein have the same meaning as commonly understood by one of ordinary skill in the art to which the invention pertains. The following definitions supplement those in the art and are directed to the current application and are not to be imputed to any related or unrelated case, e.g., to any commonly owned patent or application. Although any methods and materials similar or equivalent to those described herein can be used in the practice for testing of the present invention, the preferred materials and methods are described herein. Accordingly, the terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "a nanostructure" includes a plurality of such nanostructures, and the like.

The term "about" as used herein indicates the value of a given quantity varies by +/−10% of the value. For example, "about 100 nm" encompasses a range of sizes from 90 nm to 110 nm, inclusive.

A "nanostructure" is a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, quantum dots, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell may contain non-crystalline regions and may even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

A "nanocrystal" is a nanostructure that is substantially monocrystalline. A nanocrystal thus has at least one region or characteristic dimension with a dimension of less than about 500 nm. In some embodiments, the nanocrystal has a dimension of less than about 200 nm, less than about 100 nm, less than about 50 nm, less than about 20 nm, or less than about 10 nm. The term "nanocrystal" is intended to encompass substantially monocrystalline nanostructures comprising various defects, stacking faults, atomic substitutions, and the like, as well as substantially monocrystalline nanostructures without such defects, faults, or substitutions. In the case of nanocrystal heterostructures comprising a core and one or more shells, the core of the nanocrystal is typically substantially monocrystalline, but the shell(s) need not be. In some embodiments, each of the three dimensions of the nanocrystal has a dimension of less than about 500 nm, less than about 200 nm, less than about 100 nm, less than about 50 nm, less than about 20 nm, or less than about 10 nm.

The term "quantum dot" (or "dot") refers to a nanocrystal that exhibits quantum confinement or exciton confinement. Quantum dots can be substantially homogenous in material properties, or in certain embodiments, can be heterogeneous, e.g., including a core and at least one shell. The optical properties of quantum dots can be influenced by their particle size, chemical composition, and/or surface composition, and can be determined by suitable optical testing available in the art. The ability to tailor the nanocrystal size, e.g., in the range between about 1 nm and about 15 nm, enables photoemission coverage in the entire optical spectrum to offer great versatility in color rendering.

A "ligand" is a molecule capable of interacting (whether weakly or strongly) with one or more faces of a nanostructure, e.g., through covalent, ionic, van der Waals, or other molecular interactions with the surface of the nanostructure.

The term "molten salt" refers to molten inorganic salts and ionic liquids. The term "molten inorganic salt" refers to molten salts which contain only inorganic components/ions. The term "ionic liquid" refers to molten salts having at least one organic component/ion and a melting point below 100° C. "Ionic liquids" may be referred to as "room temperature ionic liquids."

"Photoluminescence quantum yield" is the ratio of photons emitted to photons absorbed, e.g., by a nanostructure or population of nanostructures. As known in the art, quantum yield is typically determined by a comparative method using well-characterized standard samples with known quantum yield values.

"Peak emission wavelength" (PWL) is the wavelength where the radiometric emission spectrum of the light source reaches its maximum.

As used herein, the term "blue transmittance" refers to the fraction of incident light which is transmitted, i.e., passes through, a sample, wherein the incident light has a wavelength of about 450 nm.

As used herein, the term "shell" refers to material deposited onto the core or onto previously deposited shells of the same or different composition and that result from a single act of deposition of the shell material. The exact shell thickness depends on the material as well as the precursor input and conversion and can be reported in nanometers or monolayers. As used herein, "target shell thickness" refers to the intended shell thickness used for calculation of the required precursor amount. As used herein, "actual shell thickness" refers to the actually deposited amount of shell material after the synthesis and can be measured by methods known in the art. By way of example, actual shell thickness can be measured by comparing particle diameters determined from transmission electron microscopy (TEM) images of nanocrystals before and after a shell synthesis.

As used herein, the term "layer" refers to material deposited onto the core or onto previously deposited layers and that result from a single act of deposition of the core or shell material. The exact thickness of a layer is dependent on the material. For example, a ZnSe layer may have a thickness of about 0.33 nm and a ZnS layer may have a thickness of about 0.31 nm.

As used herein, the term "full width at half-maximum" (FWHM) is a measure of the size distribution of quantum dots. The emission spectra of quantum dots generally have the shape of a Gaussian curve. The width of the Gaussian curve is defined as the FWHM and gives an idea of the size distribution of the particles. A smaller FWHM corresponds to a narrower quantum dot nanocrystal size distribution. FWHM is also dependent upon the emission wavelength maximum.

As used herein, the term "external quantum efficiency" (EQE) is a ratio of the number of photons emitted from a light emitting diode (LED) to the number of electrons passing through the device. The EQE measures how efficiently a LED converts electrons to photons and allows them to escape. EQE can be measured using the formula:

EQE=[injection efficiency]×[solid-state quantum yield]×[extraction efficiency]

where:

injection efficiency=the proportion of electrons passing through the device that are injected into the active region;

solid-state quantum yield=the proportion of all electron-hole recombinations in the active region that are radiative and thus, produce photons; and extraction efficiency=the proportion of photons generated in the active region that escape from the device.

Unless clearly indicated otherwise, ranges listed herein are inclusive.

A variety of additional terms are defined or otherwise characterized herein.

As discussed above, a need exists to prepare nanostructure compositions that have improved blue light absorbance and low blue light transmittance. Disclosed herein are methods to form $In_{(1-x)}Ga_xP$ nanostructures, wherein $0<x<1$, in a molten media. The method includes exchanging organic ligands on InP nanostructures with sulfur-containing inorganic ligands, purifying the ligand-exchanged nanostructures, dissolving the InP nanostructures in a molten salt and alloying gallium into InP nanostructures to produce $In_{(1-x)}Ga_xP$ nanostructures, wherein $0<x<1$. In some embodiments, the method further comprises forming ZnSe and/or ZnS shell layers on the $In_{(1-x)}Ga_xP$ nanostructures. The optical properties of the core/shell nanostructures showed a photoluminescent maximum at about 525 nm with a strong blue absorption. Such materials can be incorporated into LED down conversion films such as QDCC that require the emitting layer to absorb >90% of the incident light, Quantum Dot Enhancement Films (QDEF) that require lower green quantum dot loadings if the quantum dots absorb more strongly at the blue LED wavelength (e.g., about 450 nm), and on-chip or near-chip placement of the quantum dots inside the LED fluid or directly atop the LED capsule.

Production of Nanostructures

Methods for colloidal synthesis of a variety of nanostructures are known in the art. Such methods include techniques for controlling nanostructure growth, e.g., to control the size and/or shape distribution of the resulting nanostructures.

In a typical colloidal synthesis, semiconductor nanostructures are produced by rapidly injecting precursors that undergo pyrolysis into a hot solution (e.g., hot solvent and/or surfactant). The precursors can be injected simultaneously or sequentially. The precursors rapidly react to form nuclei. Nanostructure growth occurs through monomer addition to the nuclei.

Surfactant molecules interact with the surface of the nanostructure. At the growth temperature, the surfactant molecules rapidly adsorb and desorb from the nanostructure surface, permitting the addition and/or removal of atoms from the nanostructure while suppressing aggregation of the growing nanostructures. In general, a surfactant that coordinates weakly to the nanostructure surface permits rapid growth of the nanostructure, while a surfactant that binds more strongly to the nanostructure surface results in slower nanostructure growth. The surfactant can also interact with one (or more) of the precursors to slow nanostructure growth.

Nanostructure growth in the presence of a single surfactant typically results in spherical nanostructures. Using a mixture of two or more surfactants, however, permits growth to be controlled such that non-spherical nanostructures can be produced, if, for example, the two (or more) surfactants adsorb differently to different crystallographic faces of the growing nanostructure.

A number of parameters are thus known to affect nanostructure growth and can be manipulated, independently or in combination, to control the size and/or shape distribution of the resulting nanostructures. These include, e.g., temperature (nucleation and/or growth), precursor composition, time-dependent precursor concentration, ratio of the precursors to each other, surfactant composition, number of surfactants, and ratio of surfactant(s) to each other and/or to the precursors.

Synthesis of Group II-VI nanostructures has been described, e.g., in U.S. Pat. Nos. 6,225,198, 6,322,901, 6,207,229, 6,607,829, 7,060,243, 7,374,824, 6,861,155, 7,125,605, 7,566,476, 8,158,193, and 8,101,234 and U.S. Patent Appl. Publication Nos. 2011/0262752 and 2011/0263062.

Although Group II-VI nanostructures such as CdSe/CdS/ZnS core/shell nanostructures can exhibit desirable luminescence behavior, as noted above, issues such as the toxicity of cadmium limit the applications for which such nanostructures can be used. Less toxic alternatives with favorable luminescence properties are thus highly desirable.

In some embodiments, the nanostructures are free from cadmium. As used herein, the term "free of cadmium" is intended that the nanostructures contain less than 100 ppm by weight of cadmium. The Restriction of Hazardous Substances (RoHS) compliance definition requires that there must be no more than 0.01% (100 ppm) by weight of cadmium in the raw homogeneous precursor materials. The cadmium level in the Cd-free nanostructures of the present invention is limited by the trace metal concentration in the precursor materials. The trace metal (including cadmium) concentration in the precursor materials for the Cd-free nanostructures, is measured by inductively coupled plasma mass spectroscopy (ICP-MS) analysis, and are on the parts per billion (ppb) level. In some embodiments, nanostructures that are "free of cadmium" contain less than about 50 ppm, less than about 20 ppm, less than about 10 ppm, or less than about 1 ppm of cadmium.

In some embodiments, the nanostructure comprises a core comprising $In_{(1-x)}Ga_xP$, wherein $0<x<1$; and at least one shell disposed on the core. In some embodiments, the at least one shell comprises a first shell disposed on the core and a second shell disposed on the first shell. In some embodiments, the first shell comprises ZnSe. In some embodiments, the second shell comprises ZnS.

Production of the InP Nanostructures and Ligand Exchange Process

Methods for producing the InP nanostructures and ligand exchange are disclosed. The InP nanostructures can be produced as described hereinbelow (see, e.g., the sections entitled "Synthesis of InP Core for Green-Emitting Core/Shell Dots" and "Synthesis of InP Core for Red-Emitting Core/Shell Dots" in the Examples) or as known in the art (see, e.g., U.S. Pat. Nos. 7,557,028, 8,062,967, 7,645,397, U.S. patent application publication 2010/0276638 (e.g., Example 7), and U.S. Patent Appl. Publication No. 2014/0001405, as well as the references listed hereinabove). The InP nanostructures can be of essentially any desired size. For example, the InP nanostructures can have an average diameter between about 1 nm and about 5 nm. Size can be determined as is known in the art, for example, using transmission electron microscopy and/or physical modeling. In some embodiments, the diameter of the InP nanostructures is between about 1 nm and about 5 nm, between about 1 nm and about 4 nm, between about 1 nm and about 3 nm, between about 1 nm and about 2 nm, between about 2 nm and about 5 nm, between about 2 nm and about 4 nm, between about 2 nm and about 3 nm, between about 3 nm and about 5 nm, between about 3 nm and about 4 nm, or between about 4 nm and about 5 nm. In some embodiments, the diameter of the InP nanostructures is about 3 nm.

In some embodiments, the InP nanostructures are synthesized in the presence of at least one ligand. Ligands can, e.g., enhance the miscibility of nanostructures in solvents or polymers (allowing the nanostructures to be distributed throughout a composition such that the nanostructures do not aggregate together), increase quantum yield of nanostructures, and/or preserve nanostructure luminescence (e.g., when the nanostructures are incorporated into a matrix). In some embodiments, the ligand(s) for the InP nanostructures synthesis and for the shell synthesis are the same. In some embodiments, the ligand(s) for the InP nanostructures synthesis and for the shell synthesis are different. Following synthesis, any ligand on the surface of the nanostructures can be exchanged for a different ligand with other desirable properties. Examples of ligands are disclosed in U.S. Patent Application Publication Nos. 2005/0205849, 2008/0105855, 2008/0118755, 2009/0065764, 2010/0140551, 2013/0345458, 2014/0151600, 2014/0264189, and 2014/0001405.

In some embodiments, ligands suitable for the synthesis of InP nanostructures, are known by those of skill in the art. In some embodiments, the ligand is a fatty acid selected from lauric acid, caproic acid, myristic acid, palmitic acid, stearic acid, and oleic acid. In some embodiments, the ligand is an organic phosphine or an organic phosphine oxide selected from trioctylphosphine oxide, trioctylphosphine, diphenylphosphine, triphenylphosphine oxide, and tributylphosphine oxide. In some embodiments, the ligand is an alkylamine. In some embodiments, the ligand is an amine selected from dodecylamine, oleylamine, hexadecylamine, and octadecylamine. In some embodiments, the ligand is trioctylphosphine. In some embodiments, the ligand is oleylamine. In some embodiments, the ligand is diphenylphosphine.

In some embodiments, the InP nanostructures are produced in the presence of a mixture of ligands. In some embodiments, the InP nanostructures are produced in the presence of a mixture comprising 2, 3, 4, 5, or 6 different ligands. In some embodiments, the InP nanostructures are produced in the presence of a mixture comprising 3 different ligands. In some embodiments, the mixture of ligands comprises oleylamine, trioctylphosphine, and diphenylphosphine.

Prior to dispersion into the molten salt for further alloying reaction, a ligand exchange process can be performed on the InP nanostructures to improve solubility in the molten salt and provide stability of nanostructures under heat (e.g., InP nanostructures decompose at a temperature above 320° C. without ligand exchange). In some embodiments, the ligand exchange process produces the InP nanostructures comprising at least one sulfur-containing ligand. In some embodiments, the InP nanostructures comprising organic ligands such as fatty acids are admixed with at least one sulfur-containing ligand to give the InP nanostructures with a sulfur-containing ligand bound to the surface. In some embodiments, the ligand exchange process further comprises admixing the InP nanostructures with the sulfur-containing ligand bound to the surface obtained with at least one solvent. In some embodiments, the at least one solvent comprises formamide. In some embodiments, the at least one sulfur-containing ligand comprises lithium sulfide, sodium sulfide, potassium sulfide, or a combination thereof. In some embodiments, the at least one sulfur-containing ligand comprises potassium sulfide. In some embodiments, the admixing for ligand exchange lasts between about 1 hour and about 20 hours, between about 1 hour and about 15 hours, between about 1 hour and about 10 hours, between about 1 hour and about 5 hours, between 5 hours and about 20 hours, between about 5 hours and about 15 hours, between about 5 hours and about 10 hours, between about 10 hours and about 20 hours, between about 10 hours and about 15 hours, or between 10 hours and about 15 hours. In some embodiments, the admixing for ligand exchange lasts at least 20 hours. In some embodiments, the admixing for ligand exchange lasts between about 20 hours and about 50 hours, between about 20 hours and about 40 hours, between about 20 hours and about 30 hours, between about 30 hours and about 50 hours, between about 30 hours and about 40 hours, or between about 40 hours and about 50 hours.

Production of the $In_{(1-x)}Ga_xP$ Nanostructure

Methods to produce the $In_{(1-x)}Ga_xP$ nanostructures are disclosed. InP nanostructures are dispersed in a molten salt, and reacted with a gallium source to form an alloyed $In_{(1-x)}Ga_xP$ nanostructure, wherein $0<x<1$. In some embodiments, the molten salt comprises a eutectic mixture.

A variety of molten inorganic salts may be used to disperse the InP nanostructures. In some embodiments, the molten inorganic salt comprises a mixture (e.g., a eutectic mixture) of different inorganic salts. In some embodiments, the molten inorganic salt comprises a component which is a Lewis acid or a Lewis base. In some embodiments, salt additives may be included in the molten inorganic salt at an amount sufficient to provide the desired binding affinity, e.g., Lewis acid/base activity. In some embodiments, the molten inorganic salt is characterized by a melting point ($T_m$) of below 350° C. In some embodiments, the molten inorganic salt has a $T_m$ in the range between about 50° C. and about 350° C. Suitable molten inorganic salts include metal halides, such as mixed halide salts and thiocyanate salts. In some embodiments, the halide salt comprises a lithium halide, a potassium halide, a cesium halide, or a combination thereof. In some embodiments, the halide salt comprises lithium bromide (LiBr), potassium bromide (KBr), cesium bromide (CsBr), aluminum bromide ($AlBr_3$), gallium iodide ($GaI_3$), sodium chloride (NaCl), potassium chloride (KCl), aluminum chloride ($AlCl_3$), lithium chloride (LiCl), lithium iodide (LiI), potassium iodide (KI), zinc chloride ($ZnCl_2$), or a combination thereof. In some embodiments, the halide salt comprises NaCl—KCl—$AlCl_3$ mixtures. In some embodiments, the halide salt comprises LiBr—KBr—CsBr mixtures. In some embodiments, the halide salt comprises LiCl—LiBr—KBr mixtures. In some embodiments, the halide salt comprises LiCl—LiI—KI mixtures. In some embodiments, the halide salt comprises $ZnCl_2$—NaCl—KCl mixtures. In some embodiments, the thiocyanate salt comprises sodium thiocyanate (NaSCN)-potassium thiocyanate (KSCN) mixtures.

A variety of ionic liquids may also be used to disperse the InP nanostructures. Similar to the molten inorganic salts, the ionic liquid may be a mixture of different ionic liquids. In some embodiments, the ionic liquid comprises a Lewis acid or a Lewis base. Suitable ionic liquids include 1-butyl-3-methylimidazolium ([BMIM]) halides and 1-ethyl-3-methylimidazolium ([EMIM]) halides. In some embodiments, ionic liquid comprises 1-butyl-3-methylimidazolium chloride ([BMIM]$^+$Cl$^-$) and 1-butyl-3-methylimidazolium iodide ([BMIM]$^+$I$^-$). In some embodiments, ionic liquid comprises 1-butyl-3-methylimidazolium thiocyanate ([BMIM]$^+$SCN$^-$).

In some embodiments, the InP nanostructures are ground with the molten salt and heated to dissolve the InP nanostructures in the molten salt. In some embodiments, the InP nanostructures and the molten salt are heated at an elevated temperature between about 250° C. and about 450° C., between about 250° C. and about 400° C., between about 250° C. and about 350° C., between about 250° C. and about 320° C., between about 250° C. and about 300° C., between about 250° C. and about 280° C., between about 280° C. and about 450° C., between about 280° C. and about 400° C., between about 280° C. and about 350° C., between about 280° C. and about 320° C., between about 280° C. and about 300° C., between about 300° C. and about 450° C., between about 300° C. and about 400° C., between about 300° C. and about 350° C., between about 300° C. and about 320° C., between about 320° C. and about 450° C., between about 320° C. and about 400° C., between about 320° C. and about 350° C., between about 350° C. and about 450° C., between about 350° C. and about 400° C., or between about 400° C. and about 450° C. In some embodiments, the InP nanostructures and the molten salt are heated at an elevated temperature at about 300° C.

In some embodiments, the InP nanostructures and the molten salt are heated at an elevated temperature for between about 2 minutes and about 120 minutes, between about 2 minutes and about 90 minutes, between about 2 minutes and about 60 minutes, between about 2 minutes and about 40 minutes, between about 2 minutes and about 20 minutes, between about 2 minutes and about 15 minutes, between about 2 minutes and about 10 minutes, between about 2 minutes and about 5 minutes, between about 5 minutes and about 120 minutes, between about 5 minutes and about 90 minutes, between about 5 minutes and about 60 minutes, between about 5 minutes and about 40 minutes, between about 5 minutes and about 20 minutes, between about 5 minutes and about 15 minutes, between about 5 minutes and about 10 minutes, between about 10 minutes and about 120 minutes, between about 10 minutes and about 90 minutes, between about 10 minutes and about 60 minutes, between about 10 minutes and about 40 minutes, between about 10 minutes and about 20 minutes, between about 10 minutes and about 15 minutes, between about 15 minutes and about 120 minutes, between about 15 minutes and about 90 minutes, between about 15 minutes and about 60 minutes, between about 15 minutes and about 40 minutes, between about 15 minutes and about 20 minutes, between about 20 minutes and about 120 minutes, between about 20 minutes and about 90 minutes, between about 20 minutes and about 60 minutes, between about 20 minutes and about 40 minutes, between about 40 minutes and about 120 minutes, between about 40 minutes and about 90 minutes, between about 40 minutes and about 60 minutes, between about 60 minutes and about 120 minutes, between about 60 minutes and about 90 minutes, or between about 90 minutes and about 120 minutes. In some embodiments, the InP nanostructures and the molten salt are heated at an elevated temperature for between about 2 minutes and about 20 minutes. In some embodiments, the InP nanostructures and the molten salt are heated at an elevated temperature for a period until the InP nanostructures are fully dissolved in the molten salt.

In some embodiments, the molten admixture of the dispersed InP nanostructures and the molten salt are admixed with a gallium source to form an alloyed nanostructure. In some embodiments, the admixture of the dispersed InP nanostructures and the molten salt are solidified prior to the contact with the gallium source to form an alloyed nanostructure. In some embodiments, the metal source comprises a gallium source. In some embodiments, the gallium source is selected from the group consisting of gallium fluoride, gallium chloride, gallium bromide, gallium iodide, and a combination thereof. In some embodiments, the gallium source is selected from the group consisting of gallium oxide, gallium sulfide, gallium selenide, gallium telluride, and a combination thereof. In some embodiments, the gallium source is selected from the group consisting of methyl gallium, ethyl gallium, propyl gallium, and a combination thereof.

In some embodiments, the molten admixture and the gallium source are admixed at a temperature between about 200° C. and about 400° C., between about 200° C. and about 380° C., between about 200° C. and about 350° C., between about 200° C. and about 330° C., between about 200° C. and about 290° C., between about 200° C. and about 250° C., between about 250° C. and about 400° C., between about 250° C. and about 380° C., between about 250° C. and about 350° C., between about 250° C. and about 330° C., between about 250° C. and about 290° C., between about 290° C. and about 400° C., between about 290° C. and about 380° C., between about 290° C. and about 350° C., between about 290° C. and about 330° C., between about 330° C. and about 400° C., between about 330° C. and about 380° C., between about 330° C. and about 350° C., between about 350° C. and about 400° C., between about 350° C. and about 380° C., or between about 380° C. and about 400° C. In some embodiments, the molten admixture and the gallium source are admixed at a temperature between about 290° C. and about 380° C. In some embodiments, the molten admixture and the gallium source are admixed at a temperature between about 290° C. and about 330° C.

In some embodiments, the admixing of the molten admixture and the gallium source is performed for between about 20 minutes and about 240 minutes, between about 20 minutes and about 180 minutes, between about 20 minutes and about 100 minutes, between about 20 minutes and about 60 minutes, between about 20 minutes and about 40 minutes, between about 40 minutes and about 240 minutes, between about 40 minutes and about 180 minutes, between about 40 minutes and about 100 minutes, between about 40 minutes and about 60 minutes, between about 60 minutes and about 240 minutes, between about 60 minutes and about 180 minutes, between about 60 minutes and about 100 minutes, between about 100 minutes and about 240 minutes, between about 100 minutes and about 180 minutes, or between about 180 minutes and about 240 minutes. In some embodiments, the admixing of the molten admixture and the gallium source is performed for between about 20 minutes and about 180 minutes.

In some embodiments, the molar ratio of metal atom in the gallium source to indium atom in the InP nanostructure in the molten admixture is between about 0.3 and about 5, between about 0.3 and about 4, between about 0.3 and about 3, between about 0.3 and about 2, between about 0.3 and about 1, between about 0.3 and about 0.5, between about 0.5 and about 5, between about 0.5 and about 4, between about 0.5 and about 3, between about 0.5 and about 2, between about 0.5 and about 1, between about 1 and about 5, between about 1 and about 4, between about 1 and about 3, between about 1 and about 2, between about 2 and about 5, between about 2 and about 4, between about 2 and about 3, between about 3 and about 5, between about 3 and about 4, or between about 4 and about 5. In some embodiments, the molar ratio of gallium atom in the gallium source to indium atom in the InP nanostructure in the molten admixture is between about 0.3 and about 5. In some embodiments, the molar ratio of gallium atom in the gallium source to indium atom in the InP nanostructure in the molten admixture is between about 0.5 and about 2. In some embodiments, the molar ratio of gallium atom in the gallium source to indium atom in the InP nanostructure in the molten admixture is about 1.

In some embodiments, after admixing of the molten admixture and the gallium source, the admixture is admixed with at least one solvent comprising a sulfide ligand. In some embodiments, the at least one solvent comprises formamide, toluene, dilauryldimethylammonium bromide, or a mixture thereof. In some embodiments, the sulfide ligand comprises lithium sulfide, sodium sulfide, potassium sulfide, or a combination thereof. In some embodiments, the sulfide ligand comprises potassium sulfide.

In some embodiments, the $In_{(1-x)}Ga_xP$ nanostructures serve as a core for further shell growth. In some embodiments, the core further comprises a Group III-V semiconductor material comprising InP, InN, InSb, InAs, AlN, AlP, AlSb, AlAs, GaN, GaP, GaSb, GaAs, or a combination thereof. In some embodiments, the nanostructure is a quantum dot. In some embodiments, the nanostructure is free of cadmium.

The size of the cores can be determined using techniques known to those of skill in the art. In some embodiments, the size of the cores is determined using TEM. In some embodiments, the diameter of the core is between about 3 nm and about 10 nm, between about 3 nm and about 9 nm, between about 3 nm and about 8 nm, between about 3 nm and about 7 nm, between about 3 nm and about 6 nm, between about 3 nm and about 5 nm, between about 3 nm and about 4 nm, between about 4 nm and about 10 nm, between about 4 nm and about 9 nm, between about 4 nm and about 8 nm, between about 4 nm and about 7 nm, between about 4 nm and about 6 nm, between about 4 nm and about 5 nm, between about 5 nm and about 10 nm, between about 5 nm and about 9 nm, between about 5 nm and about 8 nm, between about 5 nm and about 7 nm, between about 5 nm and about 6 nm, between about 6 nm and about 10 nm, between about 6 nm and about 9 nm, between about 6 nm and about 8 nm, between about 6 nm and about 7 nm, between about 7 nm and about 10 nm, between about 7 nm and about 9 nm, between about 7 nm and about 8 nm, between about 8 nm and about 10 nm, between about 8 nm and about 9 nm, or between about 9 nm and about 10 nm. In some embodiments, the diameter of the core is between about 4.5 nm and about 6.5 nm. In some embodiments, the diameter of the core is about 5 nm.

In some embodiments, the diameter of the $In_{(1-x)}Ga_xP$ core is determined using quantum confinement. Quantum confinement in zero-dimensional nanocrystallites, such as quantum dots, arises from the spatial confinement of electrons within the crystallite boundary. Quantum confinement can be observed once the diameter of the material is of the same magnitude as the de Broglie wavelength of the wave function. The electronic and optical properties of nanostructures deviate substantially from those of bulk materials. A nanostructure behaves as if it were free when the confining dimension is large compared to the wavelength of the nanostructure. During this state, the band gap remains at its original energy due to a continuous energy state. However, as the confining dimension decreases and reaches a certain limit, typically in nanoscale, the energy spectrum becomes discrete. As a result, the band gap becomes size-dependent. This ultimately results in a blue shift in light emission as the size of the nanostructures decreases.

The concentration of the $In_{(1-x)}Ga_xP$ cores is also determined in order to calculate the concentration of materials needed to provide a shell layer. The concentration of the cores is determined using the absorption coefficient of bulk at a low wavelength (e.g., 350 nm). The concentration can then be calculated using the following equation: Concentration (mg/mL)=((average optical density (at 350 nm))*(dilution factor))/(8.08), wherein, optical density describes the transmission of light through a highly blocking optical filter. Optical density is the negative of the logarithm of the transmission.

In some embodiments, the $In_{(1-x)}Ga_xP$ cores of the nanostructures of the present invention have a $In_{(1-x)}Ga_xP$ content (by weight percentage on a metals basis) of between about 10% and about 65%, between about 10% and about 50%, between about 10% and about 40%, between about 10% and about 30%, between about 10% and about 20%, between about 20% and about 65%, between about 20% and about 50%, between about 20% and about 40%, between about 20% and about 30%, between about 30% and about 65%, between about 30% and about 50%, between about 30% and about 40%, between about 40% and about 65%, between about 40% and about 50%, or between about 50% and about 65%.

In some embodiments, the $In_{(1-x)}Ga_xP$ core nanostructures display a high photoluminescence quantum yield. In some embodiments, the core nanostructures display a photoluminescence quantum yield of between 20% to 90%, between 20% and 80%, between 20% and 70%, between 20% and 60%, between 20% and 50%, between 20% and 40%, between 20% and 30%, between 30% to 90%, between 30% and 80%, between 30% and 70%, between 30% and 60%, between 30% and 50%, between 30% and 40%, between 40% to 90%, between 40% and 80%, between 40% and 70%, between 40% and 60%, between 40% and 50%, between 50% to 90%, between 50% and 80%, between 50% and 70%, between 50% and 60%, between 60% to 90%, between 60% and 80%, between 60% and 70%, between 70% to 90%, between 70% and 80%, or between 80% and 90%.

Production of a Shell

In some embodiments, the nanostructures of the present invention comprise a core and at least one shell disposed on the core. The shell can, e.g., increase the quantum yield and/or stability of the nanostructures. In some embodiments, the nanostructures of the present invention comprise a core and at least two shells. In some embodiments, the core and the shell comprise different materials. In some embodiments, the nanostructure comprises shells of different shell material. In some embodiments, the nanostructures comprise two shells comprising a first shell disposed on the core and a second shell disposed on the first shell. In some embodiments, the first shell comprises ZnSe. In some embodiments, the second shell comprises a Group II-VI semiconductor material comprising ZnS, ZnO, ZnSe, ZnTe, MgS, MgO, MgSe, MgTe, or a combination thereof. In some embodiments, the second shell comprises ZnS. In some embodiments, the at least one shell further comprises CdS, CdSe, CdO, CdTe, ZnS, ZnO, ZnTe, MgTe, GaAs, GaSb, GaN, HgO, HgS, HgSe, HgTe, InAs, InSb, InN, AlAs, AlN, AlSb, AlS, PbS, PbO, PbSe, PbTe, MgO, MgS, MgSe, MgTe, CuCl, Ge, Si, or a combination thereof.

In some embodiments, a first shell that comprises a group II-VI semiconductor is deposited onto the core. In some embodiments, a group II-VI semiconductor comprises a mixture of Group II and VI elements. In some embodiments, the first shell deposited is obtained from a mixture of at least two of a zinc source, a selenium source, a sulfur source, a tellurium source, and a cadmium source. In some embodiments, the first shell deposited is obtained from a mixture of two of a zinc source, a selenium source, a sulfur source, a tellurium source, and a cadmium source. In some embodiments, the first shell deposited is obtained from a mixture of three of a zinc source, a selenium source, a sulfur source, a tellurium source, and a cadmium source. In some embodiments, the first shell comprises zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium, zinc, and sulfur; cadmium, zinc, and selenium; or cadmium, zinc, sulfur, and selenium. In some embodiments, the first shell comprises a Group II-VI semiconductor material comprising ZnS, ZnO, ZnSe, ZnTe, MgS, MgO, MgSe, MgTe, or a combination thereof. In some embodiments, the first shell comprises ZnSe.

In some embodiments, a second shell that comprises a group II-VI semiconductor is deposited onto the first shell. In some embodiments, a group II-VI semiconductor comprises a mixture of Group II and VI elements. In some embodiments, the second shell deposited is obtained from a mixture of at least two of a zinc source, a selenium source, a sulfur source, a tellurium source, and a cadmium source. In some embodiments, the second shell deposited is obtained from a mixture of two of a zinc source, a selenium source, a sulfur source, a tellurium source, and a cadmium source. In some embodiments, the second shell deposited is obtained from a mixture of three of a zinc source, a selenium source, a sulfur source, a tellurium source, and a cadmium source. In some embodiments, the second shell comprises zinc and sulfur; zinc and selenium; zinc, sulfur, and selenium; zinc and tellurium; zinc, tellurium, and sulfur; zinc, tellurium, and selenium; zinc, cadmium, and sulfur; zinc, cadmium, and selenium; cadmium and sulfur; cadmium and selenium; cadmium, selenium, and sulfur; cadmium, zinc, and sulfur; cadmium, zinc, and selenium; or cadmium, zinc, sulfur, and selenium. In some embodiments, the second shell comprises a Group II-VI semiconductor material comprising ZnS, ZnO, ZnSe, ZnTe, MgS, MgO, MgSe, MgTe, or a combination thereof. In some embodiments, the second shell comprises ZnSe, ZnS, or a combination thereof. In some embodiments, the second shell comprises ZnS.

In some embodiments, each shell comprises more than one monolayer of shell material. The number of monolayers is an average for all the nanostructures; therefore, the number of monolayers in a shell may be a fraction. In some embodiments, the number of monolayers in a first shell is between 0.25 and 15, between 0.25 and 10, between 0.25 and 8, between 0.25 and 6, between 0.25 and 4, between 0.25 and 2, between 2 and 15, between 2 and 10, between 2 and 8, between 2 and 6, between 2 and 4, between 6 and 15, between 6 and 10, between 6 and 8, between 8 and 15, or between 8 and 10. In some embodiments, the first shell comprises between 2 and 15 monolayers. In some embodiments, the number of monolayers in a second shell is between 0.25 and 20, between 0.25 and 15, between 0.25 and 10, between 0.25 and 8, between 0.25 and 6, between 0.25 and 4, between 0.25 and 2, between 2 and 20, between 2 and 15, between 2 and 10, between 2 and 8, between 2 and 6, between 2 and 4, between 6 and 20, between 6 and 15, between 6 and 10, between 6 and 8, between 8 and 20, between 8 and 15, or between 8 and 10. In some embodiments, the second shell comprises between 2 and 20 monolayers.

The thickness of the shell can be controlled by varying the amount of precursor provided. For a given shell thickness, at least one of the precursors is optionally provided in an amount whereby, when a growth reaction is substantially complete, a shell of a predetermined thickness is obtained. If more than one different precursor is provided, either the amount of each precursor can be limited or one of the precursors can be provided in a limiting amount while the others are provided in excess.

The thickness of each shell can be determined using techniques known to those of skill in the art. In some embodiments, the thickness of each shell is determined by comparing the average diameter of the nanostructure before and after the addition of each shell. In some embodiments, the average diameter of the nanostructure before and after the addition of each shell is determined by TEM.

In some embodiments, the thickness of the first shell is between about 0.5 nm and about 4 nm, between about 0.5 nm and about 3.5 nm, between about 0.5 nm and about 3 nm, between about 0.5 nm and about 2.5 nm, between about 0.5 nm and about 2 nm, between about 0.5 nm and about 1.5 nm, between about 0.5 nm and about 1 nm, between about 1 nm and about 4 nm, between about 1 nm and about 3.5 nm, between about 1 nm and about 3 nm, between about 1 nm and about 2.5 nm, between about 1 nm and about 2 nm, between about 1 nm and about 1.5 nm, between about 1.5 nm and about 4 nm, between about 1.5 nm and about 3.5 nm, between about 1.5 nm and about 3 nm, between about 1.5 nm and about 2.5 nm, between about 1.5 nm and about 2 nm, between about 2 nm and about 4 nm, between about 2 nm and about 3.5 nm, between about 2 nm and about 3 nm, between about 2 nm and about 2.5 nm, between about 2.5 nm and about 4 nm, between about 2.5 nm and about 3.5 nm, between about 2.5 nm and about 3 nm, between about 3 nm and about 4 nm, between about 3 nm and about 3.5 nm, or between about 3.5 nm and about 4 nm. In some embodiments, the thickness of the first shell is between about 0.5 nm and about 4 nm. In some embodiments, the thickness of the first shell is about 1.5 nm.

In some embodiments, the thickness of the second shell is between about 0.5 nm and about 3 nm, between about 0.5 nm and about 2.5 nm, between about 0.5 nm and about 2 nm, between about 0.5 nm and about 1.5 nm, between about 0.5 nm and about 1 nm, between about 1 nm and about 3 nm, between about 1 nm and about 2.5 nm, between about 1 nm and about 2 nm, between about 1 nm and about 1.5 nm, between about 1.5 nm and about 3 nm, between about 1.5 nm and about 2.5 nm, between about 1.5 nm and about 2 nm, between about 2 nm and about 3 nm, between about 2 nm and about 2.5 nm, or between about 2.5 nm and about 3 nm. In some embodiments, the thickness of the second shell is between about 0.5 nm and about 3 nm. In some embodiments, the thickness of the second shell is about 0.5 nm.

In some embodiments, each shell is synthesized in the presence of at least one nanostructure ligand. Ligands can, e.g., enhance the miscibility of nanostructures in solvents or polymers (allowing the nanostructures to be distributed throughout a composition such that the nanostructures do not aggregate together), increase quantum yield of nanostructures, and/or preserve nanostructure luminescence (e.g., when the nanostructures are incorporated into a matrix). Following synthesis, any ligand on the surface of the nanostructures can be exchanged for a different ligand with other desirable properties. Examples of ligands are disclosed in U.S. Pat. Nos. 7,572,395, 8,143,703, 8,425,803, 8,563,133, 8,916,064, 9,005,480, 9,139,770, and 9,169,435, and in U.S. Patent Appl. Publication No. 2008/0118755.

Ligands suitable for the synthesis of a shell are known by those of skill in the art. In some embodiments, the ligand is a fatty acid selected from the group consisting of lauric acid, caproic acid, caprylic acid, myristic acid, palmitic acid, stearic acid, and oleic acid. In some embodiments, the ligand is an organic phosphine or an organic phosphine oxide selected from trioctylphosphine oxide, trioctylphosphine, diphenylphosphine, triphenylphosphine oxide, and tributylphosphine oxide. In some embodiments, the ligand is an amine selected from the group consisting of dodecylamine, oleylamine, hexadecylamine, dioctylamine, and octadecylamine. In some embodiments, the ligand is trioctylphosphine oxide, trioctylphosphine, or lauric acid.

In some embodiments, each shell is produced in the presence of a mixture of ligands. In some embodiments, each shell is produced in the presence of a mixture comprising 2, 3, 4, 5, or 6 different ligands. In some embodiments, each shell is produced in the presence of a mixture comprising 3 different ligands. In some embodiments, the mixture of ligands comprises tributylphosphine oxide, trioctylphosphine, and lauric acid.

In some embodiments, each shell is produced in the presence of a solvent. In some embodiments, the solvent is selected from the group consisting of 1-octadecene, 1-hexadecene, 1-eicosene, eicosane, octadecane, hexadecane, tetradecane, squalene, squalane, trioctylphosphine oxide, and dioctyl ether.

In some embodiments, a core or a core/shell(s) and shell precursor are admixed at a temperature between about 20° C. and about 350° C., about 20° C. and about 280° C., about 20° C. and about 250° C., about 20° C. and about 200° C., about 20° C. and about 170° C., about 20° C. and about 150° C., about 20° C. and about 100° C., about 20° C. and about 50° C., about 50° C. and about 350° C., about 50° C. and about 280° C., about 50° C. and about 250° C., about 50° C. and about 200° C., about 50° C. and about 170° C., about 50° C. and about 150° C., about 50° C. and about 100° C., about 100° C. and about 350° C., about 100° C. and about 280° C., about 100° C. and about 250° C., about 100° C. and about 200° C., about 100° C. and about 170° C., about 100° C. and about 150° C., about 150° C. and about 350° C., about 150° C. and about 280° C., about 150° C. and about 250° C., about 150° C. and about 200° C., about 150° C. and about 170° C., about 170° C. and about 350° C., about 170° C. and about 280° C., about 170° C. and about 250° C., about 170° C. and about 200° C., about 200° C. and about 350° C., about 200° C. and about 280° C., about 200° C. and about 250° C., about 250° C. and about 350° C., about 250° C. and about 280° C., or about 280° C. and about 350° C. In some embodiments, a core or a core/shell(s) and shell precursor are admixed at a temperature between about 250° C. and about 350° C. In some embodiments, a core or a core/shell(s) and shell precursor are admixed at a temperature of about 300° C. In some embodiments, a core or a core/shell(s) and shell precursor are admixed at a temperature between about 170° C. and about 250° C. In some embodiments, a core or a core/shell(s) and shell precursor are admixed at a temperature of about 220° C.

In some embodiments, after admixing a core or core/shell(s) and shell precursor, the temperature of the reaction mixture is increased to an elevated temperature between about 200° C. and about 350° C., about 200° C. and about 310° C., about 200° C. and about 280° C., about 200° C. and about 250° C., about 200° C. and about 220° C., about 220°

C. and about 350° C., about 220° C. and about 310° C., about 220° C. and about 280° C., about 220° C. and about 250° C., about 250° C. and about 350° C., about 250° C. and about 310° C., about 250° C. and about 280° C., about 280° C. and about 350° C., or about 280° C. and about 310° C. In some embodiments, after contacting a core or core/shell(s) and shell precursor, the temperature of the reaction mixture is increased to between about 280° C. and about 310° C. In some embodiments, after contacting a core or core/shell(s) and shell precursor, the temperature of the reaction mixture is increased to about 310° C.

In some embodiments, after admixing a core or core/shell(s) and shell precursor, the time for the temperature to reach the elevated temperature is between about 2 minutes and about 240 minutes, about 2 minutes and about 200 minutes, about 2 minutes and about 100 minutes, about 2 minutes and about 60 minutes, about 2 minutes and about 40 minutes, about 5 minutes and about 240 minutes, about 5 minutes and about 200 minutes, about 5 minutes and about 100 minutes, about 5 minutes and about 60 minutes, about 5 minutes and about 40 minutes, about 10 minutes and about 240 minutes, about 10 minutes and about 200 minutes, about 10 minutes and about 100 minutes, about 10 minutes and about 60 minutes, about 10 minutes and about 40 minutes, about 40 minutes and about 240 minutes, about 40 minutes and about 200 minutes, about 40 minutes and about 100 minutes, about 40 minutes and about 60 minutes, about 60 minutes and about 240 minutes, about 60 minutes and about 200 minutes, about 60 minutes and about 100 minutes, about 100 minutes and about 240 minutes, about 100 minutes and about 200 minutes, or about 200 minutes and about 240 minutes.

In some embodiments, after admixing a core or core/shell(s) and shell precursor, the temperature of the reaction mixture is maintained at an elevated temperature for between about 2 minutes and about 240 minutes, about 2 minutes and about 200 minutes, about 2 minutes and about 100 minutes, about 2 minutes and about 60 minutes, about 2 minutes and about 40 minutes, about 5 minutes and about 240 minutes, about 5 minutes and about 200 minutes, about 5 minutes and about 100 minutes, about 5 minutes and about 60 minutes, about 5 minutes and about 40 minutes, about 10 minutes and about 240 minutes, about 10 minutes and about 200 minutes, about 10 minutes and about 100 minutes, about 10 minutes and about 60 minutes, about 10 minutes and about 40 minutes, about 40 minutes and about 240 minutes, about 40 minutes and about 200 minutes, about 40 minutes and about 100 minutes, about 40 minutes and about 60 minutes, about 60 minutes and about 240 minutes, about 60 minutes and about 200 minutes, about 60 minutes and about 100 minutes, about 100 minutes and about 240 minutes, about 100 minutes and about 200 minutes, or about 200 minutes and about 240 minutes. In some embodiments, after admixing a core or core/shell(s) and shell precursor, the temperature of the reaction mixture is maintained at an elevated temperature for between about 30 minutes and about 120 minutes.

In some embodiments, additional shells are produced by further additions of shell material precursors that are added to the reaction mixture followed by maintaining at an elevated temperature. Typically, additional shell precursor is provided after reaction of the previous shell is substantially complete (e.g., when at least one of the previous precursors is depleted or removed from the reaction or when no additional growth is detectable). The further additions of precursor create additional shells.

In some embodiments, the nanostructure is cooled before the addition of additional shell material precursor to provide further shells. In some embodiments, the nanostructure is maintained at an elevated temperature before the addition of shell material precursor to provide further shells.

After sufficient layers of shell have been added for the nanostructure to reach the desired thickness and diameter, the nanostructure can be cooled. In some embodiments, the core/shell(s) nanostructures are cooled to room temperature. In some embodiments, an organic solvent is added to dilute the reaction mixture comprising the core/shell(s) nanostructures.

In some embodiments, the organic solvent used to dilute the reaction mixture is ethanol, hexane, pentane, toluene, benzene, diethylether, acetone, ethyl acetate, dichloromethane (methylene chloride), chloroform, dimethylformamide, or N-methylpyrrolidinone. In some embodiments, the organic solvent is toluene.

In some embodiments, core/shell(s) nanostructures are isolated. In some embodiments, the core/shell(s) nanostructures are isolated by precipitation using an organic solvent. In some embodiments, the core/shell(s) nanostructures are isolated by flocculation with ethanol.

The number of monolayers will determine the size of the core/shell(s) nanostructures. The size of the core/shell(s) nanostructures can be determined using techniques known to those of skill in the art. In some embodiments, the size of the core/shell(s) nanostructures is determined using TEM. In some embodiments, the core/shell(s) nanostructures have an average diameter of between about 1 nm and about 15 nm, about 1 nm and about 10 nm, about 1 nm and about 9 nm, about 1 nm and about 8 nm, about 1 nm and about 7 nm, about 1 nm and about 6 nm, about 1 nm and about 5 nm, about 5 nm and about 15 nm, about 5 nm and about 10 nm, about 5 nm and about 9 nm, about 5 nm and about 8 nm, about 5 nm and about 7 nm, about 5 nm and about 6 nm, about 6 nm and about 15 nm, about 6 nm and about 10 nm, about 6 nm and about 9 nm, about 6 nm and about 8 nm, about 6 nm and about 7 nm, about 7 nm and about 15 nm, about 7 nm and about 10 nm, about 7 nm and about 9 nm, about 7 nm and about 8 nm, about 8 nm and about 15 nm, about 8 nm and about 10 nm, about 8 nm and about 9 nm, about 9 nm and about 15 nm, about 9 nm and about 10 nm, or about 10 nm and about 15 nm. In some embodiments, the core/shell(s) nanostructures have an average diameter of between about 6 nm and about 7 nm.

In some embodiments, the core/shell(s) nanostructure is subjected to an acid etching step before deposition of an additional shell.

Production of ZnSe/ZnS Shells Over an InP Core

In some embodiments, provided is a method of making $In_{(1-x)}Ga_xP/ZnSe/ZnS$ (core/shell/shell) nanostructures, comprising: (a) providing a core comprising $In_{(1-x)}Ga_xP$ nanostructures; (b) admixing the $In_{(1-x)}Ga_xP$ nanostructures in (a) with a first zinc source and a selenium source; and (c) admixing the admixture in (b) with a second zinc source and a sulfur source to provide the $In_{(1-x)}Ga_xP/ZnSe/ZnS$ core/shell/shell nanostructures.

In some embodiments, the admixing in (b) is at a temperature between about 200° C. and about 350° C., between about 200° C. and about 300° C., between about 200° C. and about 280° C., between about 200° C. and about 250° C., between about 250° C. and about 350° C., between about 250° C. and about 300° C., between about 250° C. and about 280° C., between about 280° C. and about 350° C., between about 280° C. and about 300° C., or between about 300° C. and about 350° C. In some embodiments, the admixing in (b)

is at a temperature between about 250° C. and about 350° C. In some embodiments, the admixing in (b) is at a temperature of about 300° C.

In some embodiments, the admixing in (c) is at a temperature between about 170° C. and about 250° C., between about 185° C. and about 250° C., between about 200° C. and about 250° C., between about 220° C. and about 250° C., between about 170° C. and about 220° C., between about 185° C. and about 220° C., between about 200° C. and about 220° C., between about 170° C. and about 200° C., or between about 185° C. and about 200° C. In some embodiments, the admixing in (c) is at a temperature between about 170° C. and about 250° C. In some embodiments, the admixing in (c) is at a temperature of about 220° C.

Details of production of a ZnSe shell and ZnS shell are discussed below.

Production of a ZnSe Shell

In some embodiments, the first shell deposited onto the core nanostructure is a ZnSe shell.

In some embodiments, the shell precursors contacted with a core or core/shell(s) nanostructure to prepare an ZnSe shell comprise a zinc source and a selenium source.

In some embodiments, the zinc source is selected from the group consisting of diethylzinc, dimethylzinc, diphenylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source is zinc oleate. In some embodiments, the zinc source is zinc chloride.

In some embodiments, the selenium source is selected from the group consisting of trioctylphosphine selenide, tri(n-butyl)phosphine selenide, tri(sec-butyl)phosphine selenide, tri(tert-butyl)phosphine selenide, trimethylphosphine selenide, triphenylphosphine selenide, diphenylphosphine selenide, phenylphosphine selenide, cyclohexylphosphine selenide, octaselenol, dodecaselenol, selenophenol, elemental selenium, hydrogen selenide, bis(trimethylsilyl) selenide, and mixtures thereof. In some embodiments, the selenium source is trioctylphosphine selenide.

In some embodiments, the molar ratio of $In_{(1-x)}Ga_xP$ in the core to zinc source to prepare a ZnSe shell is between 1:2 and 1:1000, 1:2 and 1:100, 1:2 and 1:50, 1:2 and 1:25, 1:2 and 1:15, 1:2 and 1:10, 1:2 and 1:5, 1:5 and 1:1000, 1:5 and 1:100, 1:5 and 1:50, 1:5 and 1:25, 1:5 and 1:15, 1:5 and 1:10, 1:10 and 1:1000, 1:10 and 1:100, 1:10 and 1:50, 1:10 and 1:25, 1:10 and 1:15, 1:15 and 1:1000, 1:15 and 1:100, 1:15 and 1:50, 1:15 and 1:25, 1:25 and 1:1000, 1:25 and 1:100, 1:25 and 1:50, 1:50 and 1:1000, 1:50 and 1:100, or 1:100 and 1:1000.

In some embodiments, the molar ratio of $In_{(1-x)}Ga_xP$ in the core to selenium source to prepare a ZnSe shell is between 1:2 and 1:1000, 1:2 and 1:100, 1:2 and 1:50, 1:2 and 1:25, 1:2 and 1:15, 1:2 and 1:10, 1:2 and 1:5, 1:5 and 1:1000, 1:5 and 1:100, 1:5 and 1:50, 1:5 and 1:25, 1:5 and 1:15, 1:5 and 1:10, 1:10 and 1:1000, 1:10 and 1:100, 1:10 and 1:50, 1:10 and 1:25, 1:10 and 1:15, 1:15 and 1:1000, 1:15 and 1:100, 1:15 and 1:50, 1:15 and 1:25, 1:25 and 1:1000, 1:25 and 1:100, 1:25 and 1:50, 1:50 and 1:1000, 1:50 and 1:100, or 1:100 and 1:1000.

In some embodiments, a ZnSe shell has a thickness between about 0.5 nm and about 4 nm, between about 0.5 nm and about 3.5 nm, between about 0.5 nm and about 3 nm, between about 0.5 nm and about 2.5 nm, between about 0.5 nm and about 2 nm, between about 0.5 nm and about 1.5 nm, between about 0.5 nm and about 1 nm, between about 1 nm and about 4 nm, between about 1 nm and about 3.5 nm, between about 1 nm and about 3 nm, between about 1 nm and about 2.5 nm, between about 1 nm and about 2 nm, between about 1 nm and about 1.5 nm, between about 1.5 nm and about 4 nm, between about 1.5 nm and about 3.5 nm, between about 1.5 nm and about 3 nm, between about 1.5 nm and about 2.5 nm, between about 1.5 nm and about 2 nm, between about 2 nm and about 4 nm, between about 2 nm and about 3.5 nm, between about 2 nm and about 3 nm, between about 2 nm and about 2.5 nm, between about 2.5 nm and about 4 nm, between about 2.5 nm and about 3.5 nm, between about 2.5 nm and about 3 nm, between about 3 nm and about 4 nm, between about 3 nm and about 3.5 nm, or between about 3.5 nm and about 4 nm. In some embodiments, a ZnSe shell has a thickness of about 2 nm.

Production of a ZnS Shell Over a ZnSe Shell

In some embodiments, the shell deposited onto the core or core/shell(s) nanostructure is a ZnS shell. In some embodiments, the ZnS shell is alloyed with Mg forming ZnMgS.

In some embodiments, the shell precursors contacted with a core or core/shell(s) nanostructure to prepare a ZnS shell comprise a zinc source and a sulfur source.

In some embodiments, the ZnS shell passivates defects at the nanostructure surface, which leads to an improvement in the quantum yield and to higher efficiencies when used in devices such as LEDs and lasers. Furthermore, spectral impurities which are caused by defect states may be eliminated by passivation, which increases the color saturation.

In some embodiments, the zinc source is selected from the group consisting of diethylzinc, dimethylzinc, diphenylzinc, zinc acetate, zinc acetylacetonate, zinc iodide, zinc bromide, zinc chloride, zinc fluoride, zinc carbonate, zinc cyanide, zinc nitrate, zinc oleate, zinc oxide, zinc peroxide, zinc perchlorate, zinc sulfate, zinc hexanoate, zinc octanoate, zinc laurate, zinc myristate, zinc palmitate, zinc stearate, zinc dithiocarbamate, or mixtures thereof. In some embodiments, the zinc source is zinc acetate.

In some embodiments, the sulfur source is selected from the group consisting of elemental sulfur, octanethiol, dodecanethiol, octadecanethiol, tributylphosphine sulfide, cyclohexyl isothiocyanate, α-toluenethiol, ethylene trithiocarbonate, allyl mercaptan, bis(trimethylsilyl) sulfide, trioctylphosphine sulfide, and mixtures thereof. In some embodiments, the sulfur source is dodecanethiol.

In some embodiments, the molar ratio of $In_{(1-x)}Ga_xP$ in the core to zinc source to prepare a ZnS shell is between 1:2 and 1:1000, 1:2 and 1:100, 1:2 and 1:50, 1:2 and 1:25, 1:2 and 1:15, 1:2 and 1:10, 1:2 and 1:5, 1:5 and 1:1000, 1:5 and 1:100, 1:5 and 1:50, 1:5 and 1:25, 1:5 and 1:15, 1:5 and 1:10, 1:10 and 1:1000, 1:10 and 1:100, 1:10 and 1:50, 1:10 and 1:25, 1:10 and 1:15, 1:15 and 1:1000, 1:15 and 1:100, 1:15 and 1:50, 1:15 and 1:25, 1:25 and 1:1000, 1:25 and 1:100, 1:25 and 1:50, 1:50 and 1:1000, 1:50 and 1:100, or 1:100 and 1:1000.

In some embodiments, the molar ratio of $In_{(1-x)}Ga_xP$ in the core to sulfur source to prepare a ZnS shell is between 1:2 and 1:1000, 1:2 and 1:100, 1:2 and 1:50, 1:2 and 1:25, 1:2 and 1:15, 1:2 and 1:10, 1:2 and 1:5, 1:5 and 1:1000, 1:5 and 1:100, 1:5 and 1:50, 1:5 and 1:25, 1:5 and 1:15, 1:5 and 1:10, 1:10 and 1:1000, 1:10 and 1:100, 1:10 and 1:50, 1:10 and 1:25, 1:10 and 1:15, 1:15 and 1:1000, 1:15 and 1:100, 1:15 and 1:50, 1:15 and 1:25, 1:25 and 1:1000, 1:25 and 1:100, 1:25 and 1:50, 1:50 and 1:1000, 1:50 and 1:100, or 1:100 and 1:1000.

In some embodiments, a ZnS shell has a thickness between about 0.5 nm and about 3 nm, between about 0.5 nm and about 2.5 nm, between about 0.5 nm and about 2 nm, between about 0.5 nm and about 1.5 nm, between about 0.5 nm and about 1 nm, between about 1 nm and about 3 nm, between about 1 nm and about 2.5 nm, between about 1 nm and about 2 nm, between about 1 nm and about 1.5 nm, between about 1.5 nm and about 3 nm, between about 1.5 nm and about 2.5 nm, between about 1.5 nm and about 2 nm, between about 2 nm and about 3 nm, between about 2 nm and about 2.5 nm, or between about 2.5 nm and about 3 nm. In some embodiments, a ZnS shell has a thickness between about 0.5 nm and about 3 nm. In some embodiments, a ZnS shell has a thickness of about 1 nm.

Core/Shell(s) Nanostructures

In some embodiments, the core/shell(s) nanostructure is a $In_{(1-x)}Ga_xP/ZnSe/ZnS$ core/shell/shell nanostructure. In some embodiments, the core/shell(s) nanostructure is a $In_{(1-x)}Ga_xP/ZnSe/ZnS$ core/shell/shell quantum dot. In some embodiments, the core/shell(s) nanostructure is a $In_{(1-x)}Ga_xP/ZnSe/ZnSeS$ core/shell/shell nanostructure. In some embodiments, the core/shell(s) nanostructure is a $In_{(1-x)}Ga_xP/ZnSe/ZnSeS$ core/shell/shell quantum dot.

In some embodiments, the core/shell(s) nanostructures display a high photoluminescence quantum yield. In some embodiments, the core/shell(s) nanostructures display a photoluminescence quantum yield of between 30% and 99%, 30% and 95%, 30% and 90%, 30% and 85%, 30% and 80%, 30% and 60%, 30% and 50%, 30% and 40%, 40% and 99%, 40% and 95%, 40% and 90%, 40% and 85%, 40% and 80%, 40% and 60%, 40% and 50%, 50% and 99%, 50% and 95%, 50% and 90%, 50% and 85%, 60% and 99%, 60% and 95%, 60% and 85%, 80% and 99%, 80% and 90%, 80% and 85%, 85% and 99%, or 85% and 95%. In some embodiments, the core/shell(s) nanostructures display a photoluminescence quantum yield of between 50% and 60%.

In some embodiments, the core/shell(s) nanostructure emit in the blue, indigo, violet, and/or ultraviolet range. In some embodiments, the photoluminescence spectrum for the core/shell(s) nanostructure has an emission maximum between about 500 nm and about 540 nm, between about 500 nm and about 530 nm, between about 500 nm and about 520 nm, between about 500 nm and about 510 nm, between about 510 nm and about 540 nm, between about 510 nm and about 530 nm, between about 510 nm and about 520 nm, between about 520 nm and about 540 nm, between about 520 nm and about 530 nm, or between about 530 nm and about 540 nm. In some embodiments, the photoluminescence spectrum for the core/shell(s) nanostructure has an emission maximum of about 520 nm.

In some embodiments, the wavelength of maximum absorbance for the core/shell(s) nanostructure is between about 430 nm and about 490 nm, between about 430 nm and about 470 nm, between about 430 nm and about 450 nm, between about 450 nm and about 490 nm, between about 450 nm and about 470 nm, or between about 470 nm and about 490 nm. In some embodiments, the wavelength of maximum absorbance for the core/shell(s) nanostructure is about 450 nm.

The resulting core/shell(s) nanostructures are optionally embedded in a matrix (e.g., an organic polymer, silicon-containing polymer, inorganic, glassy, and/or other matrix) and present in a film matrix, used in production of a nanostructure phosphor, and/or incorporated into a device, e.g., an LED, backlight, downlight, or other display or lighting unit or an optical filter. Exemplary phosphors and lighting units can, e.g., generate a specific color light by incorporating a population of nanostructures with an emission maximum at or near the desired wavelength or a wide color gamut by incorporating two or more different populations of nanostructures having different emission maxima. A variety of suitable matrices are known in the art. See, e.g., U.S. Pat. No. 7,068,898 and U.S. Patent Appl. Publication Nos. 2010/0276638, 2007/0034833, and 2012/0113672. Exemplary nanostructure phosphor films, LEDs, backlighting units, etc. are described, e.g., in U.S. Patent Appl. Publications Nos. 2010/0276638, 2012/0113672, 2008/0237540, 2010/0110728, and 2010/0155749 and U.S. Pat. Nos. 7,374,807, 7,645,397, 6,501,091, and 6,803,719.

In some embodiments, the blue transmittance of the core/shell(s) nanostructure when present in a film matrix is less than or equal to about 15%, wherein the film matrix has a thickness between about 1 µm and about 25 µm and comprises between about 10% and about 60% of the core/shell(s) nanostructures by dry mass. In some embodiments, the blue transmittance of the nanostructure when present in a film matrix is between about 0% and about 15%, between about 0% and about 12%, between about 0% and about 10%, between about 0% and about 5%, between about 5% and about 15%, between about 5% and about 12%, between about 5% and about 10%, between about 10% and about 15%, between about 10% and about 12%, or between about 12% and about 15%, wherein the film matrix has a thickness between about 1 µm and about 25 µm and comprises between about 10% and about 60% of the core/shell(s) nanostructures by dry mass. In some embodiments, the blue transmittance of the nanostructure when present in a film matrix is about 5%, wherein the film matrix has a thickness between about 1 µm and about 25 µm and comprises between about 10% and about 60% of the core/shell(s) nanostructures by dry mass. In some embodiments, the film matrix has a blue transmittance of less than 1% when not comprising the nanostructure. As used herein, the blue transmittance is defined as the fraction of an incident light transmitted through the film matrix, wherein the incident light has a wavelength of about 450 nm.

The core/shell(s) nanostructures in the present invention has a strong absorbance at 450 nm where a blue LED centered at. The blue absorbance is measured as optical density at 450 nm per total mass ($OD_{450}$/total mass). In some embodiments, the $OD_{450}$/total mass of the nanostructure is between about 0.3 and about 1, between about 0.4 and about 1, between about 0.5 and about 1, between about 0.6 and about 1, between about 0.7 and about 1, between about 0.8 and about 1, between about 0.9 and about 1, between about 0.3 and about 0.9, between about 0.4 and about 0.9, 0.5 and about 0.9, between about 0.6 and about 0.9, between about 0.7 and about 0.9, between about 0.8 and about 0.9, between about 0.3 and about 0.8, between about 0.4 and about 0.8, between about 0.5 and about 0.8, between about 0.6 and about 0.8, between about 0.7 and about 0.8, between about 0.3 and about 0.7, between about 0.4 and about 0.7, between about 0.5 and about 0.7, between about 0.6 and about 0.7, between about 0.3 and about 0.6, between about 0.4 and about 0.6, between about 0.5 and about 0.6, between about 0.3 and about 0.5, between about 0.4 and about 0.5, or between 0.3 and about 0.4. In some embodiments, the $OD_{450}$/total mass of the nanostructure is between about 0.5 and about 1. In some embodiments, the $OD_{450}$/total mass of the nanostructure is between about 0.5 and about 0.7. In some embodiments, the $OD_{450}$/total mass of the nanostructure is about 0.6.

Core/shell(s) nanostructures resulting from the methods are also a feature of the invention. Thus, one class of embodiments provides a population of core/shell(s) nanostructures. In some embodiments, the core/shell(s) nanostructures are quantum dots.

Nanostructure Layer

In some embodiments, the present disclosure provides a nanostructure layer comprising at least one population of nanostructures, wherein the nanostructure comprises a $In_{(1-x)}Ga_xP$ core, wherein $0<x<1$, and at least one shell and $OD_{450}$/total mass of the nanostructure layer is between about 0.5 and about 1. In some embodiments, the at least one shell comprises ZnSe and ZnS (or ZnSeS).

In some embodiments, the nanostructure is a quantum dot.

Molded Article

In some embodiments, the present disclosure provides a molded article comprising at least one population of nanostructures, wherein the nanostructure comprises an $In_{(1-x)}Ga_xP$ core and at least one shell and $OD_{450}$/total mass of the nanostructure is between about 0.5 and about 1. In some embodiments, the at least one shell comprises ZnSe and ZnS (or ZnSeS).

In some embodiments, the molded article is a film, a substrate for a display device, or a light emitting diode.

In some embodiments, the nanostructure is a quantum dot.

In some embodiments, the display device comprises a quantum dot color converter. In some embodiments, the display device comprises a back plane; a display panel disposed on the back plane; and a quantum dot layer comprising the nanostructure. In some embodiments, the quantum dot layer is disposed on the display panel. In some embodiments, the quantum dot layer comprises a patterned quantum dot layer.

In some embodiments, the backplane comprises a blue LED, an LCD, an OLED, or a microLED.

In some embodiments, the display device comprises a quantum dot color converter. In some embodiments, the display device comprises a quantum dot layer comprising the nanostructure, and a light source element selected from the group consisting of a blue LED, an OLED, a microLED, and a combination thereof. In some embodiments, the quantum dot layer is disposed on the light source element. In some embodiments, the quantum dot layer comprises a patterned quantum dot layer.

In some embodiments, the quantum dot layer has a thickness between about 1 μm and about 25 μm. In some embodiments, the quantum dot layer has a thickness between about 5 μm and about 25 μm. In some embodiments, the quantum dot layer has a thickness between about 10 μm and about 12 μm.

In some embodiments, the display device or the light emitting diode does not comprise a blue light filter. In some embodiments, the blue light filter has a transmittance smaller than 15%, 10%, or 5% for light with a wavelength below about 510 nm or below about 490 nm.

Making a Nanostructure Layer

In some embodiments, the nanostructure layer can be embedded in a polymeric matrix. As used herein, the term "embedded" is used to indicate that the nanostructure population is enclosed or encased with the polymer that makes up the majority of the components of the matrix. In some embodiments, at least one nanostructure population is suitably uniformly distributed throughout the matrix. In some embodiments, the at least one nanostructure population is distributed according to an application-specific distribution. In some embodiments, the nanostructures are mixed in a polymer and applied to the surface of a substrate.

In some embodiments, a nanostructure composition is deposited to form a nanostructure layer. In some embodiments, a nanostructure composition can be deposited by any suitable method known in the art, including but not limited to painting, spray coating, solvent spraying, wet coating, adhesive coating, spin coating, tape-coating, roll coating, flow coating, inkjet vapor jetting, drop casting, blade coating, mist deposition, or a combination thereof. The nanostructure composition can be coated directly onto the desired layer of a substrate. Alternatively, the nanostructure composition can be formed into a solid layer as an independent element and subsequently applied to the substrate. In some embodiments, the nanostructure composition can be deposited on one or more barrier layers.

In some embodiments, the nanostructure layer is cured after deposition. Suitable curing methods include photo-curing, such as UV curing, and thermal curing. Traditional laminate film processing methods, tape-coating methods, and/or roll-to-roll fabrication methods can be employed in forming a nanostructure layer.

Spin Coating

In some embodiments, the nanostructure composition is deposited onto a substrate using spin coating. In spin coating a small amount of material is typically deposited onto the center of a substrate loaded onto a machine called the spinner which is secured by a vacuum. A high speed of rotation is applied on the substrate through the spinner which causes centripetal force to spread the material from the center to the edge of the substrate. While most of the material is spun off, a certain amount remains on the substrate, forming a thin film of material on the surface as the rotation continues. The final thickness of the film is determined by the nature of the deposited material and the substrate in addition to the parameters chosen for the spin process such as spin speed, acceleration, and spin time. The spin coating condition required to achieve a controlled thickness is highly dependent upon the viscosity of the deposited material and the temperature. In some embodiments, a spin speed of 500 rpm to 6000 rpm is used with a spin time of 10-60 seconds.

Mist Deposition

In some embodiments, the nanostructure composition is deposited onto a substrate using mist deposition. Mist deposition takes place at room temperature and atmospheric pressure and allows precise control over film thickness by changing the process conditions. During mist deposition, a liquid source material is turned into a very fine mist and carried to the deposition chamber by nitrogen gas. The mist is then drawn to a wafer surface by a high voltage potential between the field screen and the wafer holder. Once the droplets coalesce on the wafer surface, the wafer is removed from the chamber and thermally cured to allow the solvent to evaporate. The liquid precursor is a mixture of solvent and material to be deposited. It is carried to the atomizer by pressurized nitrogen gas. Price, S. C., et al., "Formation of Ultra-Thin Quantum Dot Films by Mist Deposition," *ESC Transactions* 11:89-94 (2007).

Spray Coating

In some embodiments, the nanostructure composition is deposited onto a substrate using spray coating. The typical equipment for spray coating comprises a spray nozzle, an atomizer, a precursor solution, and a carrier gas. In the spray deposition process, a precursor solution is pulverized into micro sized drops by means of a carrier gas or by atomization (e.g., ultrasonic, air blast, or electrostatic). The droplets that come out of the atomizer are accelerated by the substrate surface through the nozzle by help of the carrier gas which is controlled and regulated as desired. Relative motion between the spray nozzle and the substrate is defined by design for the purpose of full coverage on the substrate.

In some embodiments, application of the nanostructure composition further comprises a solvent. In some embodiments, the solvent for application of the nanostructure composition is water, organic solvents, inorganic solvents, halogenated organic solvents, or mixtures thereof. Illustrative solvents include, but are not limited to, water, $D_2O$, acetone, ethanol, dioxane, ethyl acetate, methyl ethyl ketone, isopropanol, anisole, γ-butyrolactone, dimethylformamide, N-methylpyrrolidinone, dimethylacetamide, hexamethylphosphoramide, toluene, dimethylsulfoxide, cyclopentanone, tetramethylene sulfoxide, xylene, ε-caprolactone, tetrahydrofuran, tetrachloroethylene, chloroform, chlorobenzene, dichloromethane, 1,2-dichloroethane, 1,1,2,2-tetrachloroethane, or mixtures thereof.

In some embodiments, the nanostructure compositions are thermally cured to form the nanostructure layer. In some embodiments, the compositions are cured using UV light. In some embodiments, the nanostructure composition is coated directly onto a barrier layer of a nanostructure film, and an additional barrier layer is subsequently deposited upon the nanostructure layer to create the nanostructure film. A support substrate can be employed beneath the barrier film for added strength, stability, and coating uniformity, and to prevent material inconsistency, air bubble formation, and wrinkling or folding of the barrier layer material or other materials. Additionally, one or more barrier layers are preferably deposited over a nanostructure layer to seal the material between the top and bottom barrier layers. Suitably, the barrier layers can be deposited as a laminate film and optionally sealed or further processed, followed by incorporation of the nanostructure film into the particular lighting device. The nanostructure composition deposition process can include additional or varied components, as will be understood by persons of ordinary skill in the art. Such embodiments will allow for in-line process adjustments of the nanostructure emission characteristics, such as brightness and color (e.g., to adjust the quantum dot film white point), as well as the nanostructure film thickness and other characteristics. Additionally, these embodiments will allow for periodic testing of the nanostructure film characteristics during production, as well as any necessary toggling to achieve precise nanostructure film characteristics. Such testing and adjustments can also be accomplished without changing the mechanical configuration of the processing line, as a computer program can be employed to electronically change the respective amounts of mixtures to be used in forming a nanostructure film.

Barrier Layers

In some embodiments, the molded article comprises one or more barrier layers disposed on either one or both sides of the nanostructure layer. Suitable barrier layers protect the nanostructure layer and the molded article from environmental conditions such as high temperatures, oxygen, and moisture. Suitable barrier materials include non-yellowing, transparent optical materials which are hydrophobic, chemically and mechanically compatible with the molded article, exhibit photo- and chemical-stability, and can withstand high temperatures. In some embodiments, the one or more barrier layers are index-matched to the molded article. In some embodiments, the matrix material of the molded article and the one or more adjacent barrier layers are index-matched to have similar refractive indices, such that most of the light transmitting through the barrier layer toward the molded article is transmitted from the barrier layer into the nanostructure layer. This index-matching reduces optical losses at the interface between the barrier and matrix materials.

The barrier layers are suitably solid materials, and can be a cured liquid, gel, or polymer. The barrier layers can comprise flexible or non-flexible materials, depending on the particular application. Barrier layers are preferably planar layers, and can include any suitable shape and surface area configuration, depending on the particular lighting application. In some embodiments, the one or more barrier layers will be compatible with laminate film processing techniques, whereby the nanostructure layer is disposed on at least a first barrier layer, and at least a second barrier layer is disposed on the nanostructure layer on a side opposite the nanostructure layer to form the molded article according to one embodiment. Suitable barrier materials include any suitable barrier materials known in the art. In some embodiments, suitable barrier materials include glasses, polymers, and oxides. Suitable barrier layer materials include, but are not limited to, polymers such as polyethylene terephthalate (PET); oxides such as silicon oxide, titanium oxide, or aluminum oxide (e.g., $SiO_2$, $Si_2O_3$, $TiO_2$, or $Al_2O_3$); and suitable combinations thereof. Preferably, each barrier layer of the molded article comprises at least 2 layers comprising different materials or compositions, such that the multi-layered barrier eliminates or reduces pinhole defect alignment in the barrier layer, providing an effective barrier to oxygen and moisture penetration into the nanostructure layer. The nanostructure layer can include any suitable material or combination of materials and any suitable number of barrier layers on either or both sides of the nanostructure layer. The materials, thickness, and number of barrier layers will depend on the particular application, and will suitably be chosen to maximize barrier protection and brightness of the nanostructure layer while minimizing thickness of the molded article. In preferred embodiments, each barrier layer comprises a laminate film, preferably a dual laminate film, wherein the thickness of each barrier layer is sufficiently thick to eliminate wrinkling in roll-to-roll or laminate manufacturing processes. The number or thickness of the barriers may further depend on legal toxicity guidelines in embodiments where the nanostructures comprise heavy metals or other toxic materials, which guidelines may require more or thicker barrier layers. Additional considerations for the barriers include cost, availability, and mechanical strength.

In some embodiments, the nanostructure film comprises two or more barrier layers adjacent each side of the nanostructure layer, for example, two or three layers on each side or two barrier layers on each side of the nanostructure layer. In some embodiments, each barrier layer comprises a thin glass sheet, e.g., glass sheets having a thickness of about 100 μm, 100 μm or less, or 50 μm or less.

Each barrier layer of the molded article can have any suitable thickness, which will depend on the particular requirements and characteristics of the lighting device and application, as well as the individual film components such as the barrier layers and the nanostructure layer, as will be understood by persons of ordinary skill in the art. In some embodiments, each barrier layer can have a thickness of 50 μm or less, 40 μm or less, 30 μm or less, 25 μm or less, 20 μm or less, or 15 μm or less. In certain embodiments, the barrier layer comprises an oxide coating, which can comprise materials such as silicon oxide, titanium oxide, and aluminum oxide (e.g., $SiO_2$, $Si_2O_3$, $TiO_2$, or $Al_2O_3$). The oxide coating can have a thickness of about 10 μm or less, 5 μm or less, 1 μm or less, or 100 nm or less. In certain embodiments, the barrier comprises a thin oxide coating with a thickness of about 100 nm or less, 10 nm or less, 5 nm or less, or 3 nm or less. The top and/or bottom barrier can consist of the thin oxide coating, or may comprise the thin oxide coating and one or more additional material layers.

Nanostructure Layer Features and Embodiments

In some embodiments, the nanostructure layers are used to form display devices. As used herein, a display device refers to any system with a lighting display. Such devices include, but are not limited to, devices encompassing a liquid crystal display (LCD), an emissive display such as an OLED or microLED, televisions, computers, mobile phones, smart phones, personal digital assistants (PDAs), gaming devices, electronic reading devices, digital cameras, and the like.

In some embodiments, the nanostructures are incorporated into display devices by "on-chip" placements. As used herein, "on-chip" refers to placing nanostructures into an LED cup. In some embodiments, the nanostructures are dissolved in a resin or a fluid to fill the LED cup. In some embodiments, the nanostructures are incorporated into display devices by "near-chip" placements. As used herein, "near-chip" refers to coating the top surface of the LED assembly with nanostructures such that the outgoing light passes through the nanostructure film.

Molded Articles with Improved Properties

In some embodiments, a molded article prepared using the nanostructures shows an EQE of between about 1.5% and about 20%, about 1.5% and about 15%, about 1.5% and about 12%, about 1.5% and about 10%, about 1.5% and about 8%, about 1.5% and about 4%, about 1.5% and about 3%, about 3% and about 20%, about 3% and about 15%, about 3% and about 12%, about 3% and about 10%, about 3% and about 8%, about 8% and about 20%, about 8% and about 15%, about 8% and about 12%, about 8% and about 10%, about 10% and about 20%, about 10% and about 15%, about 10% and about 12%, about 12% and about 20%, about 12% and about 15%, or about 15% and about 20%. In some embodiments, the nanostructure is a quantum dot. In some embodiments, the molded article is a light emitting diode.

In some embodiments, a molded article prepared using the nanostructures shows a photoluminescence spectrum with an emission maximum of between 500 nm and 580 nm. In some embodiments, a molded article prepared using the nanostructures shows a photoluminescence spectrum with an emission maximum of between 510 nm and 550 nm. In some embodiments, a molded article prepared using the nanostructures shows a photoluminescence spectrum with an emission maximum of about 530 nm.

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

EXAMPLES

Example 1

Synthesis of In$_{(1-x)}$Ga$_x$P Nanostructures

The multi-step synthetic process to produce In$_{(1-x)}$Ga$_x$P nanostructures is shown in FIG. 1. Prior to dispersion into the molten salt eutectic, a ligand exchange process was performed on the InP nanostructures to substitute the organic carboxylate ligands bound on the InP nanostructures with sulfide ligands to provide solubility of InP nanostructures in the molten salt and resistance to temperatures above 320° C., at which, indium carboxylates decompose.

On a small-scale (weight of InP nanostructures smaller than about 500-mg), ligand exchange was performed by mixing a volume of InP nanostructures in toluene with an equal volume of formamide containing an excess of potassium sulfide, followed by stirring for about an hour. Scaling-up the procedure resulted in slower conversion because the kinetics of the biphasic reaction was limited by the cross-sectional area of the phase boundary. For this reason, for scales larger than 1-gram InP nanostructures, the reaction was stirred for at least 20 hours. In some processes, high shear mixing was also used to accelerate the reaction.

Figure 2:
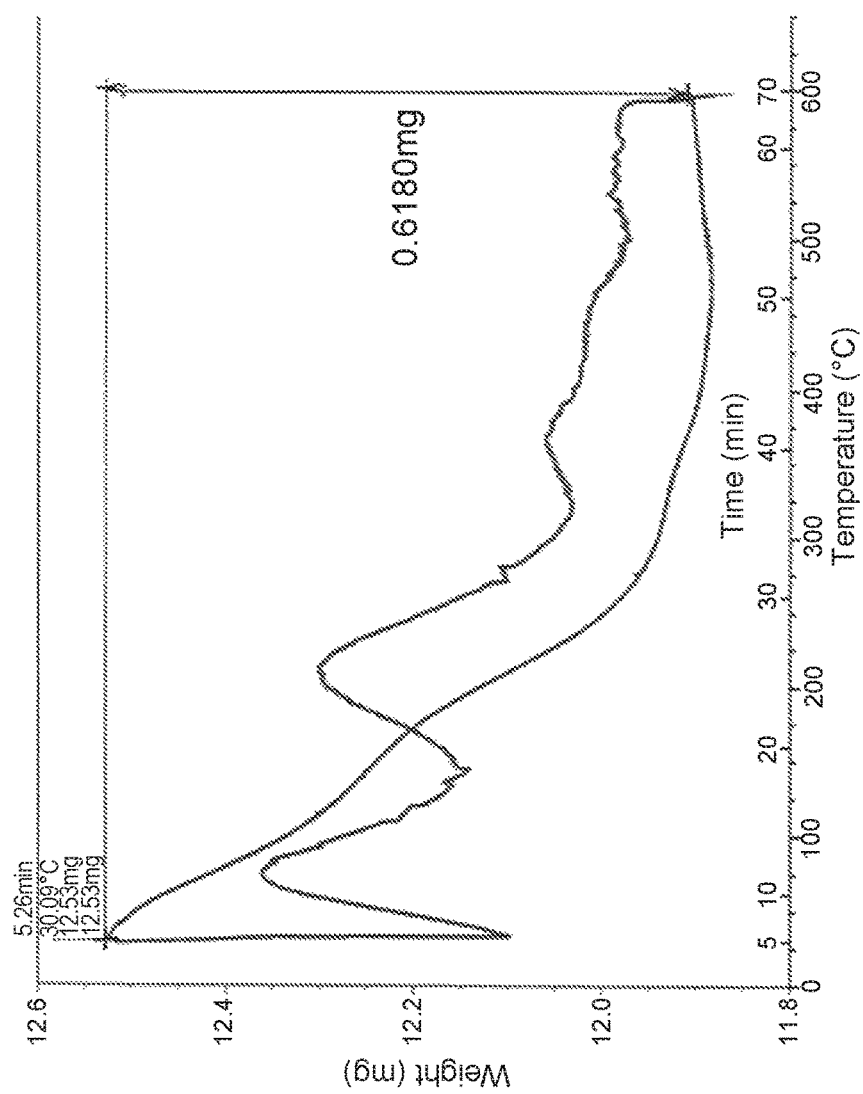
FIG. 2 is a thermogravimetric analysis graph showing weight versus temperature of a dry powder of the ligand-exchanged InP nanostructures following washing and solvent removal.

After ligand exchange, the nanostructures migrated from the toluene layer into the denser formamide layer. The formamide solution was then washed five-times with toluene to remove excess organic impurities, before the nanostructures were precipitated with acetonitrile to produce a solid. The solid was then washed twice with each of the following solvents: dimethylformamide, to remove excess potassium sulfide; acetonitrile; and diethyl ether. The final diethyl ether washing removed the dimethylformamide and acetonitrile, making it easier to dry the powder. After the thorough purification regimen, the powders comprising nanostructures showed less than 5% mass loss during Thermogravimetric analysis (TGA) measurements up to 600° C. (FIG. 2). Importantly, materials with even 9% TGA loss were not compatible with the molten salt chemistry described herein and would result in charring of the residual organics. Accordingly, the described purification process is preferred.

Figure 4:
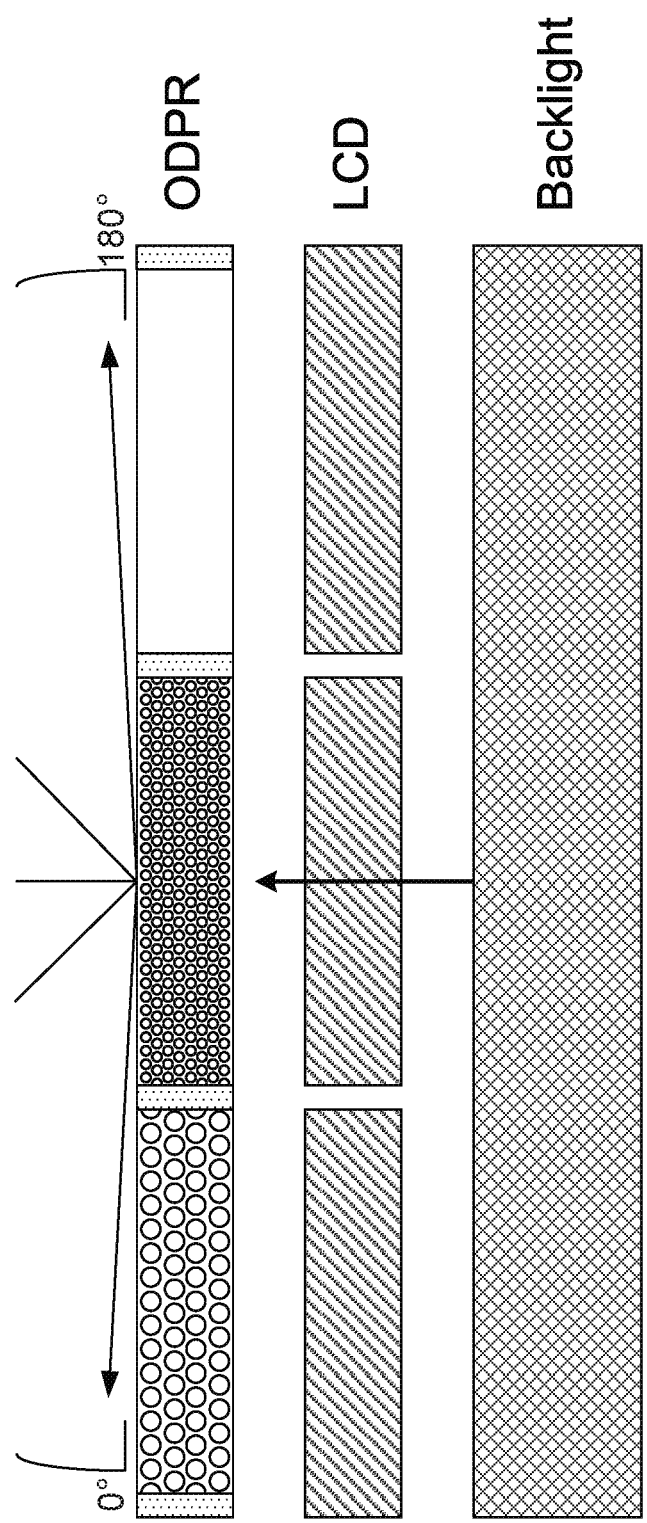
FIG. 4 shows a schematic of a display device with a QDCC component using a blue backlight and an LCD panel.

Powders of the composition comprising InP nanostructure and sulfur-containing ligand (InP/S$_x^{2-}$), obtained above, were ground with a LiBr—KBr—CsBr eutectic mixture using a mortar and pestle prior to heating to 300° C. to dissolve the InP in the molten salt eutectic. Notably, if the InP was not ground with the salt mixture prior to heating, the nanostructures appeared to sinter and did not disperse into the molten salt. In order to maintain stirring at these high temperatures, an apparatus was assembled including an aluminum heating block, a stirring hot plate, and a digital thermometer (FIG. 4). The aluminum block was short enough so that the caps of a 40 mL vial stayed relatively cool during the reaction, and a glass stir bar was used to avoid complications from the depolymerization of polytetrafluoroethylene (PTFE). This apparatus provided temperature control, stirring, and allowed sealing of the reaction vessels.

After InP/S$_x^{2-}$ was fully dissolved in the molten salt mixture, the mixture was removed from the heat block and placed into an aluminum block at ambient temperature to quickly cool and solidify the mixture. Once the salt was cooled, gallium halides (GaX$_3$, X=Cl, Br, I) were added to the mixture. While the vial was tightly capped, the mixture again was heated above 300° C. The extent of Ga-alloying could be controlled by adding different amounts of GaX$_3$ (varied from 0.3 to 5.0 equiv), the reaction temperature (300-350° C.), and the reaction time (0.5-3 hours). During Ga-alloying process, the mixture visibly lightened in color, consistent with an increase in the band gap.

Figure 3:
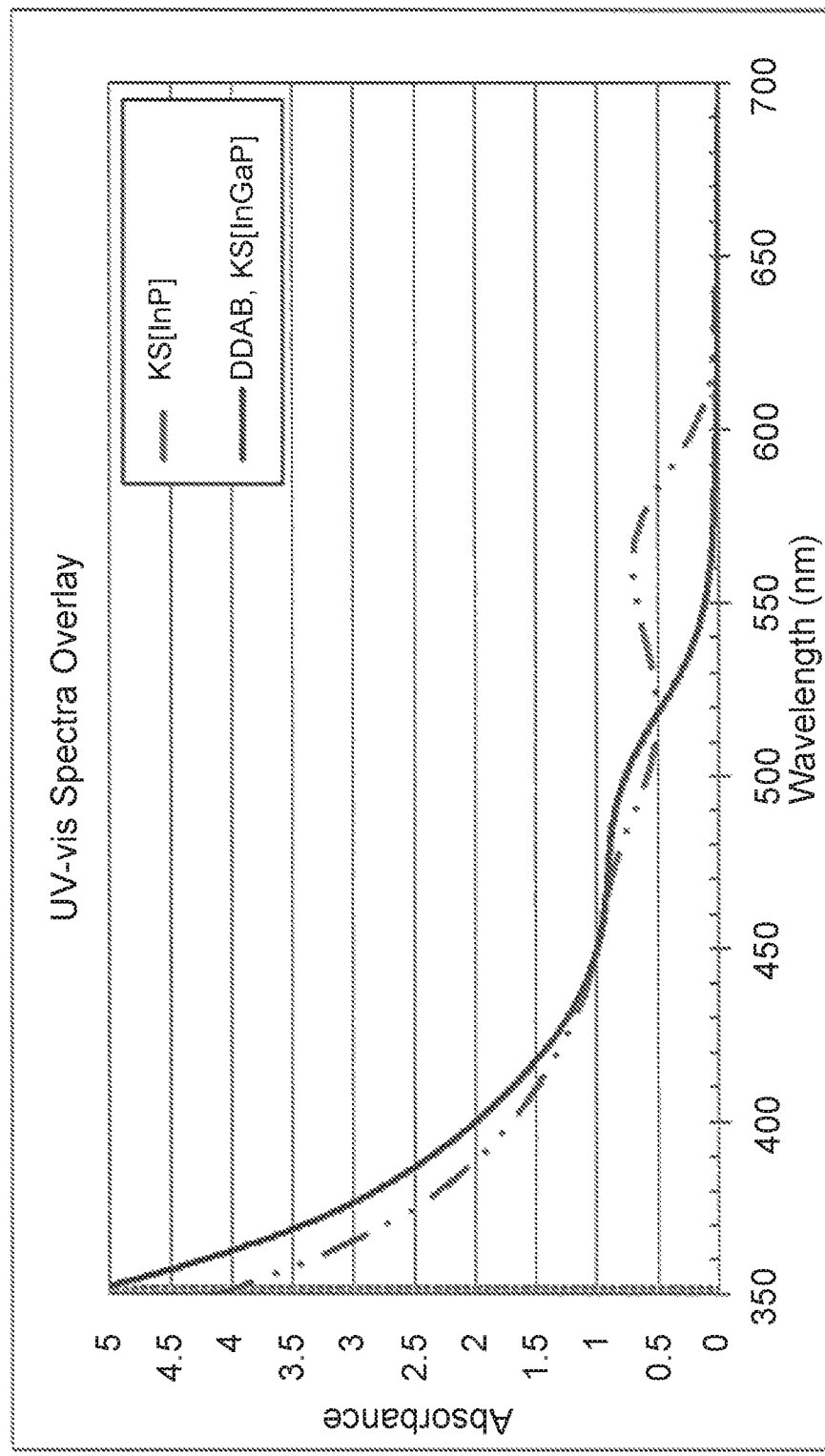
FIG. 3 shows UV-vis absorbance spectra of InP nanostructures and $In_{(1-x)}Ga_xP$ nanostructures, illustrating spectral changes that accompany the conversion of InP nanostructures to $In_{(1-x)}Ga_xP$ nanostructures, where x=0.55. The 55% $Ga^{3+}$ content (metals basis) was determined by inductively coupled plasma optical emission spectrometry (ICP-OES).

After Ga-alloying in the molten salt, the mixture was cooled, crushed using a mortar and pestle, and the salts dissolved in water. The remaining In$_{(1-x)}$Ga$_x$P nanostructures were dispersed into formamide by prolonged stirring with an excess of potassium sulfide. After the nanostructures dissolved into formamide, a mixture of toluene and dilauryldimethylammonium bromide were added to transfer the nanostructures into toluene. Once dissolved in toluene, the nanostructures were spectroscopically analyzed and used in shelling reactions. FIG. 3 shows UV-vis absorbance spectra of $In_{(1-x)}Ga_xP$ nanostructures in toluene and of the InP nanostructures from which they were prepared. FIG. 3 illustrates the spectral changes that accompanied the conversion from an InP core to an $In_{(1-x)}Ga_xP$ core, where x=0.55. The 55% $Ga^{3+}$ content was determined by inductively coupled plasma optical emission spectrometry (ICP-OES).

Example 2

Shelling Procedure for $In_{(1-x)}Ga_xP$ Alloyed Core

Reagents used for synthesizing $In_{(1-x)}Ga_xP$ core are listed in Table 1.

TABLE 1

Reagents for $In_{(1-x)}Ga_xP$ core growth in oleylamine. Sample C

| Chemical | Amount | Unit |
| --- | --- | --- |
| $In_{(1-x)}Ga_xP$ | 0.01 | g |
| Zinc chloride | 0.01 | g |
| Octadecene | 5.31 | mL |
| Zinc oleate | 1.574 | g |
| Lauric acid | 0.50 | g |
| TOPSe #1 | 0.06 | mL |
| TOPSe #2 | 0.04 | mL |
| Dodecanethiol | 0.02 | mL |

Procedure:

A 100 mL, three-neck, round-bottomed flask was equipped with a thermocouple adapter, magnetic stir bar, gas adapter, and septum. Zinc oleate, octadecene and lauric acid were added into the flask and degased. The flask was then attached to the vacuum line and placed under vacuum and heated up to about 80° C. for about 10 minutes. The flask was briefly returned to positive $N_2$ pressure and ramped to about 270° C. $In_{(1-x)}Ga_xP$ nanostructures and a first shot of selenium (TOPSe #1) was added at about 140° C. The purge trap was then attached to the vacuum line and removed at 200° C. The mixture was again ramped to 270° C., when a second shot of selenium (TOPSe #2) was added over 2 minutes. The mixture was ramped up to 310° C. and maintained at the temperature for 20 minutes. Dodecanethiol was then added over 10 minutes and the reaction temperature was maintained for about 50 minutes. The reaction was quenched by adding TOP to cool the reaction down to 170° C. The mixture was brought into the glovebox followed by subsequent purification by toluene and ethanol.

Shelling of $In_{(1-x)}Ga_xP$ nanostructures with a mixture of zinc oleate, TOPSe, and dodecanethiol provided emissive nanostructures with a composition comprising $In_{(1-x)}Ga_xP$/ZnSe/ZnS. These nanostructures emitted at shorter wavelengths than that of the core-shell nanostructures comprising an InP core. Additionally, the amount of blue light absorbed on a mass basis ($OD_{450}$/total mass) was improved from a maximum of about 0.4 for nanostructures with an InP core to about 0.6 for nanostructures with an $In_{(1-x)}Ga_xP$ core (Table 2).

TABLE 2

Summary of $In_{(1-x)}Ga_xP$/ZnSe/ZnS Nanostructures Made Using $In_{(1-x)}Ga_xP$ Cores

| InP Core Abs | Ga mole % ICP | InGaP Core Abs/nm | PL/nm | FWHM/nm | QY/% | OD/total mass | Sample |
| --- | --- | --- | --- | --- | --- | --- | --- |
| 510 nm | 40 | 475 | 523.1 | 61.1 | 3.4 | 0.57 | A |
| | 60 | 455 | 513.6 | 66.7 | 5.8 | 0.45 | B |
| | 60 | 455 | 518.2 | 63.4 | 6.7 | 0.60 | C |
| | 60 | 450 | 510.4 | 64.6 | 5.1 | 0.61 | D |
| | 60 | 450 | 520.4 | 61.9 | 10.1 | 0.57 | E |

In conclusion, the nanostructures with an $In_{(1-x)}Ga_xP$ core made by the inorganic ligand exchange method and molten salt reactions with gallium source showed an improvement of blue light absorption compared to the nanostructures with an InP core.

Example 3

Application in a QDCC

In a QDCC application, a patterned quantum dot layer (e.g., QDPR as shown in FIG. 4) is positioned near the front of the display panel (e.g., LCD as shown in FIG. 4). Blue light that passes through the backplane is absorbed by the patterned quantum dot layer and either green or red light is emitted (FIG. 4). The backplane can include a blue LED, an LCD, an OLED, a microLED, or any other modular with blue light source. In principle, violet and UV sources could be employed if a blue quantum dot were also used.

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. A nanostructure comprising:
    a core, the core comprising $In_{(1-x)}Ga_xP$, wherein 0<x<1; and
    at least one shell disposed on the core, the at least one shell comprising ZnSe;
    wherein the optical density at 450 nm per total mass ($OD_{450}$/total mass) of the nanostructure is between about 0.3 and about 1.0.

2. The nanostructure of claim 1, wherein the nanostructure comprises a first shell comprising ZnSe and a second shell.

3. The nanostructure of claim 2, wherein the second shell comprises ZnS.

4. The nanostructure of claim 1, wherein the diameter of the core is between about 3 nm and about 10 nm.

5. The nanostructure of claim 1, wherein the diameter of the core is about 5 nm.

6. The nanostructure of claim 2, wherein the thickness of the first shell is between about 0.5 nm and about 4 nm.

7. The nanostructure of claim 2, wherein the thickness of the second shell is between about 0.5 nm and about 3 nm.

8. The nanostructure of claim 1, wherein the $OD_{450}$/total mass of the nanostructure is between about 0.5 and about 0.7.

9. The nanostructure of claim 1, wherein the wavelength of maximum absorbance of the nanostructure is between about 430 nm and about 490 nm.

10. The nanostructure of claim 1, wherein the nanostructure is a quantum dot.

11. The nanostructure of claim 1, wherein the nanostructure is free of cadmium.

12. A device comprising the nanostructure of claim 1.

13. The device of claim 12, wherein the device is a display device that comprises a quantum dot color converter comprising:
   a back plane;
   a display panel disposed on the back plane; and
   a quantum dot layer comprising the nanostructure, the quantum dot layer disposed on the display panel.

14. The device of claim 13, wherein the quantum dot layer comprises a patterned quantum dot layer.

15. The device of claim 13, wherein the backplane comprises a blue LED, an LCD, an OLED, or a microLED.

16. The device of claim 13, wherein the display device does not comprise a blue light filter.

17. The device of claim 16, wherein the blue light filter has a transmittance smaller than 15% for light with a wavelength below about 510 nm.

18. A method of making $In_{(1-x)}Ga_xP$ nanostructures, wherein 0<x<1, comprising:
   (a) admixing InP nanostructures comprising at least one sulfur-containing ligand and a halide salt mixture at a temperature between about 250° C. and 450° C. to form a molten mixture;
   (b) admixing the molten mixture obtained in (a) with a gallium source at a temperature between about 290° C. and 380° C.;
   to provide the $In_{(1-x)}Ga_xP$ nanostructures.

19. The method of claim 18, wherein admixing the solid in (b) and the halide salt mixture further comprises grinding the solid in (b) and the halide salt mixture prior to the heating.

20. A method of making a $In_{(1-x)}Ga_xP$/ZnSe/ZnS core/shell/shell nanostructures, comprising:
   (a) providing a core comprising $In_{(1-x)}Ga_xP$ nanostructures;
   (b) admixing the $In_{(1-x)}Ga_xP$ nanostructures in (a) with a first zinc source and a selenium source; and
   (c) admixing the admixture in (b) with a second zinc source and a sulfur source to provide the $In_{(1-x)}Ga_xP$/ZnSe/ZnS core/shell/shell nanostructures;
   wherein 0<x<1; and wherein the optical density at 450 nm per total mass ($OD_{450}$/total mass) of the nanostructure is between about 0.3 and about 1.0.

* * * * *